United States Patent
Amar et al.

(10) Patent No.: US 11,501,351 B2
(45) Date of Patent: Nov. 15, 2022

(54) SERVERS, SYSTEMS, AND METHODS FOR SINGLE SIGN-ON OF AN AUTOMOTIVE COMMERCE EXCHANGE

(71) Applicant: CDK GLOBAL, LLC, Hoffman Estates, IL (US)

(72) Inventors: Rajiv Amar, Portland, OR (US); Sahaswaranamam Subramanian, FoxRiver Grove, IL (US)

(73) Assignee: CDK GLOBAL, LLC, Hoffman Estates, IL (US)

( * ) Notice: Subject to any disclaimer, the term of this patent is extended or adjusted under 35 U.S.C. 154(b) by 0 days.

(21) Appl. No.: 16/911,154

(22) Filed: Jun. 24, 2020

(65) Prior Publication Data
US 2020/0327592 A1 Oct. 15, 2020

Related U.S. Application Data

(63) Continuation-in-part of application No. 16/041,552, filed on Jul. 20, 2018, now Pat. No. 11,190,608.

(60) Provisional application No. 62/646,199, filed on Mar. 21, 2018.

(51) Int. Cl.
*G06Q 30/06* (2012.01)

(52) U.S. Cl.
CPC ..... *G06Q 30/0619* (2013.01); *G06Q 30/0643* (2013.01)

(58) Field of Classification Search
CPC ...... G06Q 10/087; G06Q 10/00; G06Q 30/06; G06Q 30/04
See application file for complete search history.

(56) References Cited

U.S. PATENT DOCUMENTS

| | | |
|---|---|---|
| 3,792,445 A | 2/1974 | Bucks et al. |
| 4,258,421 A | 3/1981 | Juhasz et al. |
| 4,992,940 A | 2/1991 | Dworkin |
| 5,003,476 A | 3/1991 | Abe |
| 5,034,889 A | 7/1991 | Abe |
| 5,058,044 A | 10/1991 | Stewart et al. |
| 5,421,015 A | 5/1995 | Khoyi et al. |

(Continued)

FOREIGN PATENT DOCUMENTS

| | | |
|---|---|---|
| CA | 2494350 | 5/2004 |
| EP | 0461888 | 3/1995 |
| WO | 2007002759 | 1/2007 |

OTHER PUBLICATIONS

"NetFormx Offers Advanced Network Discovery Software". PR Newswire. Mar. 15, 1999. Retrieved from http://www.highbeam.com/doc/1G1-54102907.html>.

(Continued)

*Primary Examiner* — Dhairya A Patel
(74) *Attorney, Agent, or Firm* — Stoel Rives LLP

(57) ABSTRACT

Disclosed are systems, computer servers, and methods to provide features of an automotive commerce exchange platform to users via a single sign-on. A computer server is configured to provide a plurality of different third-party features of a plurality of different third-party feature providers on the automotive commerce exchange platform, and to provide to the users, via user devices, access to individualized subsets of the third-party features via a plurality of single individualized sets of sign-on credentials. Each single individualized set of sign-on credentials corresponds to a different user.

14 Claims, 6 Drawing Sheets

(56) References Cited

U.S. PATENT DOCUMENTS

| | | |
|---|---|---|
| 5,442,553 A | 8/1995 | Parrillo |
| 5,452,446 A | 9/1995 | Johnson |
| 5,521,815 A | 5/1996 | Rose, Jr. |
| 5,649,186 A | 7/1997 | Ferguson |
| 5,694,595 A | 12/1997 | Jacobs et al. |
| 5,729,452 A | 3/1998 | Smith et al. |
| 5,764,943 A | 6/1998 | Wechsler |
| 5,787,177 A | 7/1998 | Leppek |
| 5,790,785 A | 8/1998 | Klug et al. |
| 5,835,712 A | 11/1998 | Dufresne |
| 5,845,299 A | 12/1998 | Arora et al. |
| 5,862,346 A | 1/1999 | Kley et al. |
| 5,911,145 A | 6/1999 | Arora et al. |
| 5,956,720 A | 9/1999 | Fernandez et al. |
| 5,974,149 A | 10/1999 | Leppek |
| 5,974,418 A | 10/1999 | Blinn et al. |
| 5,974,428 A | 10/1999 | Gerard et al. |
| 5,978,776 A | 11/1999 | Seretti et al. |
| 5,987,506 A | 11/1999 | Carter et al. |
| 6,003,635 A | 12/1999 | Bantz et al. |
| 6,006,201 A | 12/1999 | Berent et al. |
| 6,009,410 A | 12/1999 | Lemole et al. |
| 6,018,748 A | 1/2000 | Smith |
| 6,021,416 A | 2/2000 | Dauerer et al. |
| 6,021,426 A | 2/2000 | Douglis et al. |
| 6,026,433 A | 2/2000 | D'Arlach et al. |
| 6,041,310 A | 3/2000 | Green et al. |
| 6,041,344 A | 3/2000 | Bodamer et al. |
| 6,055,541 A | 4/2000 | Solecki et al. |
| 6,061,698 A | 5/2000 | Chadha et al. |
| 6,067,559 A | 5/2000 | Allard et al. |
| 6,070,164 A | 5/2000 | Vagnozzi |
| 6,134,532 A | 10/2000 | Lazarus et al. |
| 6,151,609 A | 11/2000 | Truong |
| 6,178,432 B1 | 1/2001 | Cook et al. |
| 6,181,994 B1 | 1/2001 | Colson et al. |
| 6,185,614 B1 | 2/2001 | Cuomo et al. |
| 6,189,104 B1 | 2/2001 | Leppek |
| 6,216,129 B1 | 4/2001 | Eldering |
| 6,219,667 B1 | 4/2001 | Lu et al. |
| 6,236,994 B1 | 5/2001 | Schwartz et al. |
| 6,240,365 B1 | 5/2001 | Bunn |
| 6,263,268 B1 | 7/2001 | Nathanson |
| 6,285,932 B1 | 9/2001 | De Belledeuille et al. |
| 6,289,382 B1 | 9/2001 | Bowman-Amuah |
| 6,295,061 B1 | 9/2001 | Park et al. |
| 6,330,499 B1 | 12/2001 | Chou et al. |
| 6,343,302 B1 | 1/2002 | Graham |
| 6,353,824 B1 | 3/2002 | Boguraev et al. |
| 6,356,822 B1 | 3/2002 | Diaz et al. |
| 6,374,241 B1 | 4/2002 | Lamburt et al. |
| 6,397,226 B1 | 5/2002 | Sage |
| 6,397,336 B2 | 5/2002 | Leppek |
| 6,401,103 B1 | 6/2002 | Ho et al. |
| 6,421,733 B1 | 7/2002 | Tso et al. |
| 6,473,849 B1 | 10/2002 | Keller et al. |
| 6,496,855 B1 | 12/2002 | Hunt et al. |
| 6,505,106 B1 | 1/2003 | Lawrence et al. |
| 6,505,205 B1 | 1/2003 | Kothuri et al. |
| 6,519,617 B1 | 2/2003 | Wanderski et al. |
| 6,529,948 B1 | 3/2003 | Bowman-Amuah |
| 6,535,879 B1 | 3/2003 | Behera |
| 6,539,370 B1 | 3/2003 | Chang et al. |
| 6,546,216 B2 | 4/2003 | Mizoguchi et al. |
| 6,553,373 B2 | 4/2003 | Boguraev et al. |
| 6,556,904 B1 | 4/2003 | Larson et al. |
| 6,564,216 B2 | 5/2003 | Waters |
| 6,571,253 B1 | 5/2003 | Thompson et al. |
| 6,581,061 B2 | 6/2003 | Graham |
| 6,583,794 B1 | 6/2003 | Wattenberg |
| 6,594,664 B1 | 7/2003 | Estrada et al. |
| 6,606,525 B1 | 8/2003 | Muthuswamy et al. |
| 6,629,148 B1 | 9/2003 | Ahmed et al. |
| 6,640,244 B1 | 10/2003 | Bowman-Amuah et al. |
| 6,643,663 B1 | 11/2003 | Dabney et al. |
| 6,654,726 B1 | 11/2003 | Hanzek |
| 6,678,706 B1 | 1/2004 | Fishel |
| 6,697,825 B1 | 2/2004 | Underwood et al. |
| 6,701,232 B2 | 3/2004 | Yamaki |
| 6,721,747 B2 | 4/2004 | Lipkin |
| 6,728,685 B1 | 4/2004 | Ahluwalia |
| 6,738,750 B2 | 5/2004 | Stone et al. |
| 6,744,735 B1 | 6/2004 | Nakaguro |
| 6,748,305 B1 | 6/2004 | Klausner et al. |
| 6,785,864 B1 | 8/2004 | Te et al. |
| 6,795,819 B2 | 9/2004 | Wheeler et al. |
| 6,823,258 B2 | 11/2004 | Ukai et al. |
| 6,823,359 B1 | 11/2004 | Heidingsfeld |
| 6,826,594 B1 | 11/2004 | Pettersen |
| 6,847,988 B2 | 1/2005 | Toyouchi et al. |
| 6,850,823 B2 | 2/2005 | Eun et al. |
| 6,871,216 B2 | 3/2005 | Miller et al. |
| 6,901,430 B1 | 3/2005 | Smith |
| 6,894,601 B1 | 5/2005 | Grunden et al. |
| 6,917,941 B2 | 7/2005 | Wight et al. |
| 6,922,674 B1 | 7/2005 | Nelson |
| 6,941,203 B2 | 9/2005 | Chen |
| 6,944,677 B1 | 9/2005 | Zhao |
| 6,954,731 B1 | 10/2005 | Montague et al. |
| 6,963,854 B1 | 11/2005 | Boyd et al. |
| 6,965,806 B2 | 11/2005 | Eryurek et al. |
| 6,965,968 B1 | 11/2005 | Touboul |
| 6,978,273 B1 | 12/2005 | Bonneau et al. |
| 6,981,028 B1 | 12/2005 | Rawat et al. |
| 6,990,629 B1 | 1/2006 | Heaney et al. |
| 6,993,421 B2 | 1/2006 | Pillar |
| 7,000,184 B2 | 2/2006 | Matveyenko et al. |
| 7,003,476 B1 | 2/2006 | Samra et al. |
| 7,010,495 B1 | 3/2006 | Samra et al. |
| 7,028,072 B1 | 4/2006 | Kliger et al. |
| 7,031,554 B2 | 4/2006 | Iwane |
| 7,039,704 B2 | 5/2006 | Davis et al. |
| 7,047,318 B1 | 5/2006 | Svedloff |
| 7,062,343 B2 | 6/2006 | Ogushi et al. |
| 7,062,506 B2 | 6/2006 | Taylor et al. |
| 7,072,943 B2 | 7/2006 | Landesmann |
| 7,092,803 B2 | 8/2006 | Kapolka et al. |
| 7,107,268 B1 | 9/2006 | Zawadzki et al. |
| 7,124,116 B2 | 10/2006 | Huyler |
| 7,152,207 B1 | 12/2006 | Underwood et al. |
| 7,155,491 B1 | 12/2006 | Schultz et al. |
| 7,171,418 B2 | 1/2007 | Blessin |
| 7,184,866 B2 | 2/2007 | Squires et al. |
| 7,197,764 B2 | 3/2007 | Cichowlas |
| 7,219,234 B1 | 5/2007 | Ashland et al. |
| 7,240,125 B2 | 7/2007 | Fleming |
| 7,246,263 B2 | 7/2007 | Skingle |
| 7,281,029 B2 | 10/2007 | Rawat |
| 7,287,000 B2 | 10/2007 | Boyd et al. |
| 7,322,007 B2 | 1/2008 | Schowtka et al. |
| 7,386,786 B2 | 6/2008 | Davis et al. |
| 7,401,289 B2 | 7/2008 | Lachhwani et al. |
| 7,406,429 B2 | 7/2008 | Salonen |
| 7,433,891 B2 | 10/2008 | Haber et al. |
| 7,457,693 B2 | 11/2008 | Olsen et al. |
| 7,477,968 B1 | 1/2009 | Lowrey |
| 7,480,551 B1 | 1/2009 | Lowrey et al. |
| 7,496,543 B1 | 2/2009 | Bamford et al. |
| 7,502,672 B1 | 3/2009 | Kolls |
| 7,536,641 B2 | 5/2009 | Rosenstein et al. |
| 7,548,985 B2 | 6/2009 | Guigui |
| 7,587,504 B2 | 9/2009 | Adams et al. |
| 7,590,476 B2 | 9/2009 | Shumate |
| 7,593,925 B2 | 9/2009 | Cadiz et al. |
| 7,593,999 B2 | 9/2009 | Nathanson |
| 7,613,627 B2 * | 11/2009 | Doyle ............. G06Q 10/0639 |
| | | 705/7.41 |
| 7,620,484 B1 | 11/2009 | Chen |
| 7,624,342 B2 | 11/2009 | Matveyenko et al. |
| 7,657,594 B2 | 2/2010 | Banga et al. |
| 7,664,667 B1 | 2/2010 | Ruppelt et al. |
| 7,739,007 B2 | 6/2010 | Logsdon |
| 7,747,680 B2 | 6/2010 | Ravikumar et al. |
| 7,778,841 B1 | 8/2010 | Bayer et al. |

(56) References Cited

U.S. PATENT DOCUMENTS

| | | |
|---|---|---|
| 7,801,945 B1 | 9/2010 | Geddes et al. |
| 7,818,380 B2 | 10/2010 | Tamura et al. |
| 7,861,309 B2 | 12/2010 | Spearman et al. |
| 7,865,409 B1 | 1/2011 | Monaghan |
| 7,870,253 B2 | 1/2011 | Muilenburg et al. |
| 7,899,701 B1 | 3/2011 | Odom |
| 7,908,051 B2 | 3/2011 | Oesterling |
| 7,979,506 B2 | 7/2011 | Cole |
| 8,010,423 B2 | 8/2011 | Bodin et al. |
| 8,019,501 B2 | 9/2011 | Breed |
| 8,036,788 B2 | 10/2011 | Breed |
| 8,051,159 B2 | 11/2011 | Muilenburg et al. |
| 8,055,544 B2 | 11/2011 | Ullman et al. |
| 8,060,274 B2 | 11/2011 | Boss et al. |
| 8,095,403 B2 | 1/2012 | Price |
| 8,099,308 B2 | 1/2012 | Uyeki |
| 8,135,804 B2 | 3/2012 | Uyeki |
| 8,145,379 B2 | 3/2012 | Schwinke |
| 8,190,322 B2 | 5/2012 | Lin et al. |
| 8,209,259 B2 | 6/2012 | Graham, Jr. et al. |
| 8,212,667 B2 | 7/2012 | Petite et al. |
| 8,271,473 B2 | 9/2012 | Berg |
| 8,271,547 B2 | 9/2012 | Taylor et al. |
| 8,275,717 B2 | 9/2012 | Ullman et al. |
| 8,285,439 B2 | 10/2012 | Hodges |
| 8,296,007 B2 | 10/2012 | Swaminathan et al. |
| 8,311,905 B1 | 11/2012 | Campbell et al. |
| 8,355,950 B2 | 1/2013 | Colson et al. |
| 8,407,664 B2 * | 3/2013 | Moosmann ............... G06F 8/10 717/106 |
| 8,428,815 B2 | 4/2013 | Van Engelshoven et al. |
| 8,438,310 B2 | 5/2013 | Muilenburg et al. |
| 8,448,057 B1 | 5/2013 | Sugnet |
| 8,521,654 B2 | 8/2013 | Ford et al. |
| 8,538,894 B2 | 9/2013 | Ullman et al. |
| 8,645,193 B2 | 2/2014 | Swinson et al. |
| 8,676,638 B1 | 3/2014 | Blair et al. |
| 8,725,341 B2 | 5/2014 | Ogasawara |
| 8,745,641 B1 | 6/2014 | Coker |
| 8,849,689 B1 | 9/2014 | Jagannathan et al. |
| 8,886,389 B2 | 11/2014 | Edwards et al. |
| 8,924,071 B2 * | 12/2014 | Stanek .................. G07C 5/008 701/31.4 |
| 8,954,222 B2 | 2/2015 | Costantino |
| 8,996,230 B2 | 3/2015 | Lorenz et al. |
| 8,996,235 B2 | 3/2015 | Singh et al. |
| 9,014,908 B2 | 4/2015 | Chen et al. |
| 9,015,059 B2 | 4/2015 | Sims et al. |
| 9,026,304 B2 | 5/2015 | Olsen, III et al. |
| 9,047,722 B2 | 6/2015 | Kurnik et al. |
| 9,165,413 B2 | 10/2015 | Jones et al. |
| 9,183,681 B2 | 11/2015 | Fish |
| 9,325,650 B2 | 4/2016 | Yalavarty et al. |
| 9,349,223 B1 | 5/2016 | Palmer |
| 9,384,597 B2 | 7/2016 | Koch et al. |
| 9,477,936 B2 * | 10/2016 | Lawson .................. H04L 43/14 |
| 9,577,866 B2 | 2/2017 | Rogers et al. |
| 9,596,287 B2 | 3/2017 | Rybak et al. |
| 9,619,945 B2 | 4/2017 | Adderly et al. |
| 9,659,495 B2 | 5/2017 | Modica et al. |
| 9,706,008 B2 | 7/2017 | Rajan et al. |
| 9,715,665 B2 | 7/2017 | Schondorf et al. |
| 9,754,304 B2 | 9/2017 | Taira et al. |
| 9,778,045 B2 | 10/2017 | Bang |
| 9,836,714 B2 | 12/2017 | Lander et al. |
| 10,032,139 B2 | 7/2018 | Adderly et al. |
| 10,083,411 B2 | 9/2018 | Kinsey et al. |
| 10,169,607 B1 * | 1/2019 | Sheth .................. G16H 15/00 |
| 10,229,394 B1 | 3/2019 | Davis et al. |
| 10,448,120 B1 | 10/2019 | Bursztyn et al. |
| 10,475,256 B2 | 11/2019 | Chowdhury et al. |
| 10,541,938 B1 | 1/2020 | Timmerman et al. |
| 10,552,871 B1 | 2/2020 | Chadwick |
| 11,117,253 B2 | 9/2021 | Oleynik |
| 2001/0005831 A1 | 6/2001 | Lewin et al. |
| 2001/0014868 A1 | 8/2001 | Herz et al. |
| 2001/0037332 A1 | 11/2001 | Miller et al. |
| 2001/0039594 A1 | 11/2001 | Park et al. |
| 2001/0054049 A1 | 12/2001 | Maeda et al. |
| 2002/0023111 A1 | 2/2002 | Arora et al. |
| 2002/0024537 A1 | 2/2002 | Jones et al. |
| 2002/0026359 A1 | 2/2002 | Long et al. |
| 2002/0032626 A1 | 3/2002 | Dewolf et al. |
| 2002/0032701 A1 | 3/2002 | Gao et al. |
| 2002/0042738 A1 | 4/2002 | Srinivasan et al. |
| 2002/0046245 A1 | 4/2002 | Hillar et al. |
| 2002/0049831 A1 | 4/2002 | Platner et al. |
| 2002/0052778 A1 | 5/2002 | Murphy et al. |
| 2002/0059260 A1 | 5/2002 | Jas |
| 2002/0065698 A1 | 5/2002 | Schick et al. |
| 2002/0065739 A1 | 5/2002 | Florance et al. |
| 2002/0069110 A1 | 6/2002 | Sonnenberg |
| 2002/0073080 A1 | 6/2002 | Lipkin |
| 2002/0082978 A1 | 6/2002 | Ghouri et al. |
| 2002/0091755 A1 | 7/2002 | Narin |
| 2002/0107739 A1 | 8/2002 | Schlee |
| 2002/0111727 A1 | 8/2002 | Vanstory et al. |
| 2002/0111844 A1 | 8/2002 | Vanstory et al. |
| 2002/0116418 A1 | 8/2002 | Lachhwani et al. |
| 2002/0123359 A1 | 9/2002 | Wei et al. |
| 2002/0124053 A1 | 9/2002 | Adams et al. |
| 2002/0128728 A1 | 9/2002 | Murakami et al. |
| 2002/0129054 A1 | 9/2002 | Ferguson et al. |
| 2002/0133273 A1 | 9/2002 | Lowrey et al. |
| 2002/0138331 A1 | 9/2002 | Hosea et al. |
| 2002/0143646 A1 | 10/2002 | Boyden et al. |
| 2002/0154146 A1 | 10/2002 | Rodriquez et al. |
| 2002/0169851 A1 | 11/2002 | Weathersby et al. |
| 2002/0173885 A1 | 11/2002 | Lowrey et al. |
| 2002/0188869 A1 * | 12/2002 | Patrick .................. G06F 21/6245 726/4 |
| 2002/0196273 A1 | 12/2002 | Krause |
| 2002/0198761 A1 | 12/2002 | Ryan et al. |
| 2002/0198878 A1 | 12/2002 | Baxter et al. |
| 2003/0014443 A1 | 1/2003 | Bernstein et al. |
| 2003/0023632 A1 | 1/2003 | Ries et al. |
| 2003/0033378 A1 | 2/2003 | Needham et al. |
| 2003/0036832 A1 | 2/2003 | Kokes et al. |
| 2003/0036964 A1 | 2/2003 | Boyden et al. |
| 2003/0037263 A1 | 2/2003 | Kamat et al. |
| 2003/0046179 A1 | 3/2003 | Anabtawi et al. |
| 2003/0051022 A1 | 3/2003 | Sogabe et al. |
| 2003/0055666 A1 | 3/2003 | Roddy et al. |
| 2003/0061263 A1 | 3/2003 | Riddle |
| 2003/0065532 A1 | 4/2003 | Takaoka |
| 2003/0065583 A1 | 4/2003 | Takaoka |
| 2003/0069785 A1 | 4/2003 | Lohse |
| 2003/0069790 A1 | 4/2003 | Kane |
| 2003/0074392 A1 | 4/2003 | Campbell et al. |
| 2003/0095038 A1 | 5/2003 | Dix |
| 2003/0101262 A1 | 5/2003 | Godwin |
| 2003/0115292 A1 | 6/2003 | Griffin et al. |
| 2003/0120502 A1 | 6/2003 | Robb et al. |
| 2003/0145310 A1 | 7/2003 | Thames et al. |
| 2003/0177050 A1 | 9/2003 | Crampton et al. |
| 2003/0177175 A1 | 9/2003 | Worley et al. |
| 2003/0225853 A1 | 12/2003 | Wang et al. |
| 2003/0229623 A1 | 12/2003 | Chang et al. |
| 2003/0233246 A1 | 12/2003 | Snapp et al. |
| 2004/0012631 A1 | 1/2004 | Skorski |
| 2004/0039646 A1 | 2/2004 | Hacker |
| 2004/0041818 A1 | 3/2004 | White et al. |
| 2004/0073546 A1 | 4/2004 | Forster et al. |
| 2004/0073564 A1 | 4/2004 | Haber et al. |
| 2004/0088228 A1 | 5/2004 | Mercer et al. |
| 2004/0093243 A1 | 5/2004 | Bodin et al. |
| 2004/0117046 A1 | 6/2004 | Colle et al. |
| 2004/0122735 A1 | 6/2004 | Meshkin et al. |
| 2004/0128320 A1 | 7/2004 | Grove et al. |
| 2004/0139203 A1 | 7/2004 | Graham, Jr. et al. |
| 2004/0148342 A1 | 7/2004 | Cotte |
| 2004/0156020 A1 | 8/2004 | Edwards |
| 2004/0163047 A1 | 8/2004 | Nagahara et al. |
| 2004/0181464 A1 | 9/2004 | Vanker et al. |

(56) References Cited

U.S. PATENT DOCUMENTS

| | | |
|---|---|---|
| 2004/0199413 A1 | 10/2004 | Hauser et al. |
| 2004/0220863 A1 | 11/2004 | Porter et al. |
| 2004/0225664 A1 | 11/2004 | Casement |
| 2004/0230897 A1 | 11/2004 | Latzel |
| 2004/0255233 A1 | 12/2004 | Croney et al. |
| 2004/0267263 A1 | 12/2004 | May |
| 2004/0268225 A1 | 12/2004 | Walsh et al. |
| 2004/0268232 A1 | 12/2004 | Tunning |
| 2005/0015491 A1 | 1/2005 | Koeppel |
| 2005/0021197 A1 | 1/2005 | Zimmerman et al. |
| 2005/0027611 A1 | 2/2005 | Wharton |
| 2005/0065804 A1 | 3/2005 | Worsham et al. |
| 2005/0096963 A1 | 5/2005 | Myr et al. |
| 2005/0108112 A1 | 5/2005 | Ellenson et al. |
| 2005/0114270 A1 | 5/2005 | Hind et al. |
| 2005/0114764 A1 | 5/2005 | Gudenkauf et al. |
| 2005/0108637 A1 | 6/2005 | Sahota et al. |
| 2005/0149398 A1 | 7/2005 | Mckay |
| 2005/0171836 A1 | 8/2005 | Leacy |
| 2005/0176482 A1 | 8/2005 | Raisinghani et al. |
| 2005/0187834 A1 | 8/2005 | Painter et al. |
| 2005/0198121 A1* | 9/2005 | Daniels .................. G06Q 10/10 709/203 |
| 2005/0228736 A1 | 10/2005 | Norman et al. |
| 2005/0256755 A1 | 11/2005 | Chand et al. |
| 2005/0267774 A1 | 12/2005 | Merritt et al. |
| 2005/0268282 A1 | 12/2005 | Laird |
| 2005/0289020 A1 | 12/2005 | Bruns et al. |
| 2005/0289599 A1 | 12/2005 | Matsuura et al. |
| 2006/0031811 A1 | 2/2006 | Ernst et al. |
| 2006/0059253 A1 | 3/2006 | Goodman et al. |
| 2006/0064637 A1 | 3/2006 | Rechterman et al. |
| 2006/0123330 A1 | 6/2006 | Horiuchi et al. |
| 2006/0129423 A1 | 6/2006 | Sheinson et al. |
| 2006/0129982 A1 | 6/2006 | Doyle |
| 2006/0136105 A1 | 6/2006 | Larson |
| 2006/0161841 A1 | 7/2006 | Horiuchi et al. |
| 2006/0200751 A1 | 9/2006 | Underwood et al. |
| 2006/0224447 A1 | 10/2006 | Koningstein |
| 2006/0248442 A1 | 11/2006 | Rosenstein et al. |
| 2006/0265355 A1 | 11/2006 | Taylor |
| 2006/0271844 A1 | 11/2006 | Suklikar |
| 2006/0277588 A1 | 12/2006 | Harrington et al. |
| 2006/0282328 A1 | 12/2006 | Gerace et al. |
| 2006/0282547 A1 | 12/2006 | Hasha et al. |
| 2007/0005446 A1 | 1/2007 | Fusz et al. |
| 2007/0016486 A1 | 1/2007 | Stone et al. |
| 2007/0027754 A1 | 2/2007 | Collins et al. |
| 2007/0033087 A1 | 2/2007 | Combs et al. |
| 2007/0033520 A1 | 2/2007 | Kimzey et al. |
| 2007/0053513 A1 | 3/2007 | Hoffberg |
| 2007/0100519 A1 | 5/2007 | Engel |
| 2007/0150368 A1 | 6/2007 | Arora et al. |
| 2007/0209011 A1 | 9/2007 | Padmanabhuni et al. |
| 2007/0226540 A1* | 9/2007 | Konieczny ......... G05B 23/0278 714/26 |
| 2007/0250229 A1 | 10/2007 | Wu |
| 2007/0250327 A1 | 10/2007 | Hedy |
| 2007/0250840 A1 | 10/2007 | Coker et al. |
| 2007/0271154 A1 | 11/2007 | Broudy et al. |
| 2007/0271330 A1 | 11/2007 | Mattox et al. |
| 2007/0271389 A1 | 11/2007 | Joshi et al. |
| 2007/0282711 A1 | 12/2007 | Ullman et al. |
| 2007/0282712 A1 | 12/2007 | Ullman et al. |
| 2007/0282713 A1 | 12/2007 | Ullman et al. |
| 2007/0288413 A1 | 12/2007 | Mizuno et al. |
| 2007/0294192 A1 | 12/2007 | Tellefsen |
| 2008/0010561 A1* | 1/2008 | Bay .................. H04L 67/10 714/49 |
| 2008/0015921 A1 | 1/2008 | Libman |
| 2008/0015929 A1 | 1/2008 | Koeppel et al. |
| 2008/0027827 A1 | 1/2008 | Eglen et al. |
| 2008/0119983 A1 | 5/2008 | Inbaraj et al. |
| 2008/0172632 A1 | 7/2008 | Stambaugh |
| 2008/0189143 A1 | 8/2008 | Wurster |
| 2008/0195435 A1 | 8/2008 | Bentley et al. |
| 2008/0195932 A1 | 8/2008 | Oikawa et al. |
| 2008/0201163 A1 | 8/2008 | Barker et al. |
| 2008/0255925 A1 | 10/2008 | Vailaya et al. |
| 2009/0012887 A1 | 1/2009 | Taub et al. |
| 2009/0024918 A1 | 1/2009 | Silverbrook et al. |
| 2009/0043780 A1 | 2/2009 | Hentrich, Jr. et al. |
| 2009/0070435 A1 | 3/2009 | Abhyanker |
| 2009/0089134 A1 | 4/2009 | Uyeki |
| 2009/0106036 A1 | 4/2009 | Tamura et al. |
| 2009/0112687 A1 | 4/2009 | Blair et al. |
| 2009/0138329 A1 | 5/2009 | Wanker |
| 2009/0182232 A1 | 7/2009 | Zhang et al. |
| 2009/0187513 A1 | 7/2009 | Noy et al. |
| 2009/0187939 A1 | 7/2009 | Lajoie |
| 2009/0198507 A1 | 8/2009 | Rhodus |
| 2009/0204454 A1 | 8/2009 | Lagudi |
| 2009/0204655 A1 | 8/2009 | Wendelberger |
| 2009/0222532 A1 | 9/2009 | Finlaw |
| 2009/0265607 A1 | 10/2009 | Raz et al. |
| 2009/0313035 A1 | 12/2009 | Esser et al. |
| 2010/0011415 A1 | 1/2010 | Cortes et al. |
| 2010/0023393 A1 | 1/2010 | Costy et al. |
| 2010/0070343 A1 | 3/2010 | Taira et al. |
| 2010/0082778 A1 | 4/2010 | Muilenburg et al. |
| 2010/0082780 A1 | 4/2010 | Muilenburg et al. |
| 2010/0088158 A1 | 4/2010 | Pollack |
| 2010/0100259 A1 | 4/2010 | Geiter |
| 2010/0100506 A1 | 4/2010 | Marot |
| 2010/0131363 A1 | 5/2010 | Sievert et al. |
| 2010/0235219 A1 | 9/2010 | Merrick et al. |
| 2010/0235231 A1 | 9/2010 | Jewer |
| 2010/0293030 A1 | 11/2010 | Wu |
| 2010/0312608 A1 | 12/2010 | Shan et al. |
| 2010/0318408 A1 | 12/2010 | Sankaran et al. |
| 2010/0324777 A1 | 12/2010 | Tominaga et al. |
| 2011/0010432 A1 | 1/2011 | Uyeki |
| 2011/0015989 A1 | 1/2011 | Tidwell et al. |
| 2011/0022525 A1 | 1/2011 | Swinson et al. |
| 2011/0082804 A1 | 4/2011 | Swinson et al. |
| 2011/0145064 A1 | 6/2011 | Anderson et al. |
| 2011/0161167 A1 | 6/2011 | Jallapuram |
| 2011/0191264 A1 | 8/2011 | Inghelbrecht et al. |
| 2011/0196762 A1 | 8/2011 | Dupont |
| 2011/0224864 A1 | 9/2011 | Gellatly et al. |
| 2011/0231055 A1 | 9/2011 | Knight et al. |
| 2011/0288937 A1 | 11/2011 | Manoogian, III |
| 2011/0307296 A1 | 12/2011 | Hall et al. |
| 2011/0307411 A1 | 12/2011 | Bolivar et al. |
| 2012/0066010 A1* | 3/2012 | Williams ............... G06Q 40/08 705/305 |
| 2012/0089474 A1 | 4/2012 | Xiao et al. |
| 2012/0095804 A1 | 4/2012 | Calabrese et al. |
| 2012/0116868 A1 | 5/2012 | Chin et al. |
| 2012/0158211 A1 | 6/2012 | Chen et al. |
| 2012/0209714 A1 | 8/2012 | Douglas et al. |
| 2012/0221125 A1 | 8/2012 | Bell |
| 2012/0268294 A1* | 10/2012 | Michaelis ............... G06F 9/451 340/459 |
| 2012/0278886 A1 | 11/2012 | Luna |
| 2012/0284113 A1 | 11/2012 | Pollak |
| 2012/0316981 A1 | 12/2012 | Hoover et al. |
| 2013/0046432 A1 | 2/2013 | Edwards et al. |
| 2013/0080196 A1 | 3/2013 | Schroeder et al. |
| 2013/0080305 A1* | 3/2013 | Virag .................. G06Q 30/0629 705/35 |
| 2013/0151334 A1 | 6/2013 | Berkhin et al. |
| 2013/0191445 A1* | 7/2013 | Gayman ................. H04L 67/75 709/203 |
| 2013/0204484 A1 | 8/2013 | Ricci |
| 2013/0226699 A1 | 8/2013 | Long |
| 2013/0325541 A1 | 12/2013 | Capriotti et al. |
| 2013/0332023 A1 | 12/2013 | Bertosa et al. |
| 2014/0012659 A1 | 1/2014 | Yan |
| 2014/0026037 A1 | 1/2014 | Garb et al. |
| 2014/0052327 A1 | 2/2014 | Hosein et al. |
| 2014/0088866 A1 | 3/2014 | Knapp et al. |
| 2014/0094992 A1 | 4/2014 | Lambert et al. |
| 2014/0122178 A1 | 5/2014 | Knight |

(56) References Cited

U.S. PATENT DOCUMENTS

| | | | |
|---|---|---|---|
| 2014/0136278 A1 | 5/2014 | Carvalho | |
| 2014/0229391 A1 | 8/2014 | East et al. | |
| 2014/0244110 A1 | 8/2014 | Tharaldson et al. | |
| 2014/0277906 A1 | 9/2014 | Lowrey et al. | |
| 2014/0278805 A1 | 9/2014 | Thompson | |
| 2014/0316825 A1 | 10/2014 | Van Dijk et al. | |
| 2014/0324275 A1 | 10/2014 | Stanek et al. | |
| 2014/0324536 A1 | 10/2014 | Cotton | |
| 2014/0331301 A1* | 11/2014 | Subramani | H04L 63/104 726/8 |
| 2014/0337163 A1 | 11/2014 | Whisnant | |
| 2014/0379530 A1 | 12/2014 | Kim et al. | |
| 2014/0379817 A1 | 12/2014 | Logue et al. | |
| 2015/0057875 A1 | 2/2015 | Mcginnis et al. | |
| 2015/0058151 A1* | 2/2015 | Sims | G06Q 30/08 705/26.3 |
| 2015/0066781 A1 | 3/2015 | Johnson et al. | |
| 2015/0066933 A1 | 3/2015 | Kolodziej et al. | |
| 2015/0100199 A1 | 4/2015 | Kurnik et al. | |
| 2015/0142256 A1* | 5/2015 | Jones | G06Q 10/06 701/31.4 |
| 2015/0227894 A1* | 8/2015 | Mapes, Jr. | G06Q 10/20 705/305 |
| 2015/0268059 A1 | 9/2015 | Borghesani et al. | |
| 2015/0278886 A1 | 10/2015 | Fusz | |
| 2015/0286979 A1 | 10/2015 | Ming et al. | |
| 2015/0334165 A1* | 11/2015 | Arling | G05B 15/02 709/201 |
| 2016/0004516 A1* | 1/2016 | Ivanov | G06F 8/34 717/106 |
| 2016/0059412 A1 | 3/2016 | Oleynik | |
| 2016/0071054 A1 | 3/2016 | Kakarala et al. | |
| 2016/0092944 A1 | 3/2016 | Taylor et al. | |
| 2016/0132935 A1 | 5/2016 | Shen et al. | |
| 2016/0140609 A1 | 5/2016 | Demir | |
| 2016/0140620 A1 | 5/2016 | Pinkowish et al. | |
| 2016/0140622 A1 | 5/2016 | Wang et al. | |
| 2016/0148439 A1 | 5/2016 | Akselrod et al. | |
| 2016/0162817 A1* | 6/2016 | Grimaldi | G06Q 10/0633 |
| 2016/0180358 A1 | 6/2016 | Battista | |
| 2016/0180378 A1 | 6/2016 | Toshida et al. | |
| 2016/0180418 A1* | 6/2016 | Jaeger | G06Q 30/0617 705/26.1 |
| 2016/0267503 A1 | 9/2016 | Zakai-Or et al. | |
| 2016/0275533 A1 | 9/2016 | Smith et al. | |
| 2016/0307174 A1 | 10/2016 | Marcelle et al. | |
| 2016/0357599 A1* | 12/2016 | Glatfelter | G06Q 10/06311 |
| 2016/0371641 A1* | 12/2016 | Wilson | G06Q 10/0832 |
| 2017/0034547 A1 | 2/2017 | Jain et al. | |
| 2017/0039785 A1 | 2/2017 | Richter et al. | |
| 2017/0053460 A1 | 2/2017 | Hauser et al. | |
| 2017/0064038 A1 | 3/2017 | Chen | |
| 2017/0124525 A1 | 5/2017 | Johnson et al. | |
| 2017/0262894 A1 | 9/2017 | Kirti et al. | |
| 2017/0293894 A1 | 10/2017 | Taliwal et al. | |
| 2017/0308844 A1 | 10/2017 | Kelley | |
| 2017/0308864 A1 | 10/2017 | Kelley | |
| 2017/0308865 A1 | 10/2017 | Kelley | |
| 2017/0316459 A1 | 11/2017 | Strauss et al. | |
| 2017/0337573 A1* | 11/2017 | Toprak | G06Q 30/0278 |
| 2017/0352054 A1 | 12/2017 | Ma et al. | |
| 2018/0095733 A1* | 4/2018 | Torman | G06F 40/143 |
| 2018/0225710 A1 | 8/2018 | Kar et al. | |
| 2018/0232749 A1 | 8/2018 | Moore, Jr. et al. | |
| 2018/0285901 A1 | 10/2018 | Zackrone | |
| 2018/0285925 A1 | 10/2018 | Zackrone | |
| 2019/0297162 A1 | 9/2019 | Amar et al. | |
| 2019/0334884 A1 | 10/2019 | Ross et al. | |
| 2020/0019388 A1 | 1/2020 | Jaeger et al. | |
| 2020/0038363 A1 | 2/2020 | Kim | |
| 2020/0177476 A1 | 6/2020 | Agarwal et al. | |
| 2021/0287106 A1 | 9/2021 | Jerram | |
| 2022/0046105 A1 | 2/2022 | Amar et al. | |
| 2022/0172723 A1* | 6/2022 | Tendolkar | G10L 15/26 |
| 2022/0191663 A1* | 6/2022 | Karpoor | H04W 4/50 |

OTHER PUBLICATIONS

Advisory Action for U.S. Appl. No. 14/208,042, filed Mar. 13, 2014, and mailed from the USPTO dated Jul. 12, 2018.

Advisory Action for U.S. Appl. No. 15/602,999, filed May 23, 2017, and mailed from the USPTO dated Jan. 31, 2019, 3 pgs.

Aloisio, Giovanni et al., "Web-based access to the Grid using the Grid Resource Broker portal," Google 2002, pp. 1145-1160.

Anonymous, "Software ready for prime time." Automotive News. Detroit, Nov. 5, 2001. vol. 76, Issue 5996, p. 28.

Chadwick, D. W., "Understanding X.500—The Directory." Available at <http://sec.cs.kent.ac.uk/x500book/>. 1996. Entire work cited.

Chen, Deren, "Business to Business Standard and Supply Chain System Framework in Virtual Enterprises," Computer Supported Cooperative Work in Design, The Sixth International Conference on, 2001; Publication Year 2001, pp. 472-476.

CNY Business Journal, "Frank La Voila named Southern Tier Small-Business Person of 1999". Jun. 11, 1999. 2 pgs.

Davis, Peter T. et al., "Sams Teach Yourself Microsoft Windows NT Server 4 in 21 Days," Sams® Publishing, © 1999. ISBN: 0-672-31555-6, 15 pgs., printed Dec. 21, 2008.

Derfler, Frank J. et al., "How Networks Work: Millennium Edition," Que, A Division of Macmillan Computer Publishing, © 2000. ISBN: 0-7897-2445-6, 9 pgs.

Final Office Action for U.S. Appl. No. 10/350,795, filed Jan. 24, 2003, and mailed from the USPTO dated Jul. 6, 2011, 26 pgs.

Final Office Action for U.S. Appl. No. 10/350,795, filed Jan. 24, 2003, and mailed from the USPTO dated Mar. 3, 2010, 24 pgs.

Final Office Action for U.S. Appl. No. 10/350,810, filed Jan. 24, 2003, and mailed from the USPTO dated Apr. 5, 2005, 12 pgs.

Final Office Action for U.S. Appl. No. 10/350,810, filed Jan. 24, 2003, and mailed from the USPTO dated May 18, 2006, 15 pgs.

Final Office Action for U.S. Appl. No. 10/350,810, filed Jan. 24, 2003, and mailed from the USPTO dated Nov. 14, 2007, 13 pgs.

Final Office Action for U.S. Appl. No. 10/351,465, filed Jan. 24, 2003, and mailed from the USPTO dated May 5, 2005, 8 pgs.

Final Office Action for U.S. Appl. No. 10/665,899, filed Sep. 18, 2003, and mailed from the USPTO dated Feb. 24, 2010, 22 pgs.

Final Office Action for U.S. Appl. No. 10/665,899, filed Sep. 18, 2003, and mailed from the USPTO dated Jul. 7, 2008, 11 pgs.

Final Office Action for U.S. Appl. No. 10/665,899, filed Sep. 18, 2003, and mailed from the USPTO dated Mar. 8, 2011, 21 pgs.

Final Office Action for U.S. Appl. No. 10/665,899, filed Sep. 18, 2003, and mailed from the USPTO dated May 11, 2009, 14 pgs.

Final Office Action for U.S. Appl. No. 11/149,909, filed Jun. 10, 2005, and mailed from the USPTO dated Feb. 4, 2009, 14 pgs.

Final Office Action for U.S. Appl. No. 11/442,821, filed May 30, 2006, and mailed from the USPTO dated Apr. 7, 2009, 19 pgs.

Final Office Action for U.S. Appl. No. 11/442,821, filed May 30, 2006, and mailed from the USPTO dated May 21, 2010, 28 pgs.

Final Office Action for U.S. Appl. No. 11/442,821, filed May 30, 2006, and mailed from the USPTO dated Nov. 29, 2011, 26 pgs.

Final Office Action for U.S. Appl. No. 11/446,011, filed Jun. 2, 2006, and mailed from the USPTO dated Jun. 8, 2010, 12 pgs.

Final Office Action for U.S. Appl. No. 11/524,602, filed Sep. 21, 2006, and mailed from the USPTO dated Jul. 27, 2010, 13 pgs.

Final Office Action for U.S. Appl. No. 11/524,602, filed Sep. 21, 2006, and mailed from the USPTO dated Jun. 26, 2012, 11 pgs.

Final Office Action for U.S. Appl. No. 11/525,009, filed Sep. 21, 2006, and mailed from the USPTO dated Aug. 3, 2010, 16 pgs.

Final Office Action for U.S. Appl. No. 12/243,852, filed Oct. 1, 2008, and mailed from the USPTO dated Oct. 24, 2011, 13 pgs.

Final Office Action for U.S. Appl. No. 12/243,861, filed Oct. 1, 2008, and mailed from the USPTO dated Jun. 22, 2011, 5 pgs.

Final Office Action for U.S. Appl. No. 13/025,019, filed Feb. 10, 2011, and mailed from the USPTO dated Aug. 28, 2015, 25 pgs.

(56) References Cited

OTHER PUBLICATIONS

Final Office Action for U.S. Appl. No. 13/025,019, filed Feb. 10, 2011, and mailed from the USPTO dated Dec. 20, 2016, 16 pgs.
Final Office Action for U.S. Appl. No. 13/025,019, filed Feb. 10, 2011, and mailed from the USPTO dated Jul. 13, 2018, 11 pgs.
Final Office Action for U.S. Appl. No. 13/025,019, filed Feb. 10, 2011, and mailed from the USPTO dated Sep. 12, 2013, 13 pgs.
Final Office Action for U.S. Appl. No. 13/025,019, filed Feb. 20, 2011 and mailed from the USPTO dated Dec. 20, 2016, 16 pgs.
Final Office Action for U.S. Appl. No. 14/208,042, filed Mar. 13, 2014, and mailed from the USPTO dated Jan. 11, 2019, 16 pgs.
Final Office Action for U.S. Appl. No. 14/208,042, filed Mar. 13, 2014, and mailed from the USPTO dated Apr. 16, 2018.
Final Office Action for U.S. Appl. No. 14/208,042, filed Mar. 13, 2014, and mailed from the USPTO dated Dec. 6, 2016, 26 pgs.
Final Office Action for U.S. Appl. No. 15/602,999, filed May 23, 2017, and mailed from the USPTO dated Nov. 21, 2018.
Final Office Action dated Sep. 21, 2018 in U.S. Appl. No. 15/134,820.
Hogue et al., "Thresher: Automating the Unwrapping of Semantic Content from the World Wide Web," ACM 2005, pp. 86-95.
Housel, Barron C. et al., "WebExpress: A client/intercept based system for optimizing Web browsing in a wireless environment," Google 1998, pp. 419-431.
http://web.archive.org/web/20010718130244/http://chromedata.com/maing2/about/index.asp, 1 pg.
http://web.archive.org/web/20050305055408/http://www.dealerclick.com/, 1 pg.
U.S. Appl. No. 16/041,552, Non-Final Office Action, dated Sep. 17, 2020, 16 pages.
U.S. Appl. No. 14/208,042, et al., Notice of Allowance, dated May 6, 2021, 13 pages.
U.S. Appl. No. 15/478,042, et al.. Final Office Action, dated May 5, 2021, 38 pages.
U.S. Appl. No. 16/041,552 et al.. Final Office Action, dated Apr. 27, 2021, 23 pages.
Johns,Pamela et al.,Competitive intelligence in service marketing, Marketing Intelligence & Planning, vol. 28, No. 5, 2010, pp. 551-570.
U.S. Appl. No. 14/208,042, Non-Final Office Action, dated Aug. 21, 2020, 13 pages.
Milic-Frayling, Natasa, et al., "SmartView: Enhanced Document Viewer for Mobile Devices," Google Nov. 15, 2002, 11 pgs.
Non-Final Office Action for U.S. Appl. No. 12/243,852, filed Oct. 1, 2008, and mailed from the USPTO dated Jan. 16, 2013, 5 pgs.
Non-Final Office Action for U.S. Appl. No. 12/243,852, filed Oct. 1, 2008, and mailed from the USPTO dated Mar. 17, 2011, 8 pgs.
Non-Final Office Action for U.S. Appl. No. 12/243,855, filed Oct. 1, 2008, and mailed from the USPTO dated Oct. 14, 2010, 6 pgs.
Non-Final Office Action for U.S. Appl. No. 12/243,861, filed Oct. 1, 2008, and mailed from the USPTO dated Nov. 8, 2010, 8 pgs.
Non-Final Office Action for U.S. Appl. No. 13/025,019, filed Feb. 10, 2011, and mailed from the USPTO dated Apr. 22, 2016, 16 pgs.
Non-Final Office Action for U.S. Appl. No. 13/025,019, filed Feb. 10, 2011, and mailed from the USPTO dated Apr. 5, 2013, 15 pgs.
Non-Final Office Action for U.S. Appl. No. 13/025,019, filed Feb. 10, 2011, and mailed from the USPTO dated Oct. 6, 2017, 17 pgs.
Non-Final Office Action for U.S. Appl. No. 13/025,019, filed Feb. 10, 2011, and mailed from the USPTO dated Sep. 18, 2014, 15 pgs.
Non-Final Office Action for U.S. Appl. No. 14/208,042, filed Mar. 13, 2014, and mailed from the USPTO dated Jun. 30, 2016, 23 pgs.
Non-Final Office Action for U.S. Appl. No. 14/208,042, filed Mar. 13, 2014, and mailed from the USPTO dated Sep. 20, 2017.
Non-Final Office Action for U.S. Appl. No. 14/208,042, filed Mar. 13, 2014, and mailed from the USPTO dated Sep. 21, 2018.
Non-Final Office Action for U.S. Appl. No. 15/134,779, filed Apr. 21, 2016, and mailed from the USPTO dated Jan. 30, 2019, 26 pgs.
Non-Final Office Action for U.S. Appl. No. 15/134,820, filed Apr. 21, 2016, and mailed from the USPTO dated Feb. 23, 2018.
Non-Final Office Action for U.S. Appl. No. 15/602,999, filed May 23, 2017, and mailed from the USPTO dated May 3, 2018.
Non-Final Office Action dated Oct. 6, 2017 in U.S. Appl. No. 13/025,019.
Non-Final Office Action received in U.S. Appl. No. 15/134,793, filed Apr. 21, 2016, mailed by United States Patent and Trademark Office dated Jan. 30, 2019, 26 pgs.
Notice of Allowance and Fee(s) Due for U.S. Appl. No. 10/350,795, filed Jan. 24, 2003, and mailed from the USPTO dated May 7, 2012, 15 pgs.
Notice of Allowance and Fee(s) Due for U.S. Appl. No. 10/350,796, filed Jan. 24, 2003 and mailed from the USPTO dated Feb. 1, 2006, 5 pgs.
Notice of Allowance and Fee(s) Due for U.S. Appl. No. 10/350,810, filed Jan. 24, 2003, and mailed from the USPTO dated Apr. 14, 2008, 6 pgs.
Notice of Allowance and Fee(s) Due for U.S. Appl. No. 10/351,465, filed Jan. 24, 2003, and mailed from the USPTO dated Sep. 21, 2005, 4 pgs.
Notice of Allowance and Fee(s) Due for U.S. Appl. No. 10/351,606, filed Jan. 24, 2003 and mailed from the USPTO dated Apr. 4, 2006, 8 pgs.
Notice of Allowance and Fee(s) Due for U.S. Appl. No. 10/351,606, filed Jan. 24, 2003, and mailed from the USPTO dated Apr. 4, 2006, 12 pgs.
Notice of Allowance and Fee(s) Due for U.S. Appl. No. 11/149,909, filed Jun. 10, 2005, and mailed from the USPTO dated Sep. 16, 2009, 7 pgs.
Notice of Allowance and Fee(s) Due for U.S. Appl. No. 11/414,939, filed May 1, 2006, and mailed from the USPTO dated Nov. 2, 2010, pgs.
Notice of Allowance and Fee(s) Due for U.S. Appl. No. 11/442,821, filed May 30, 2006, and mailed from the USPTO dated Jul. 30, 2012, 6 pgs.
Notice of Allowance and Fee(s) Due for U.S. Appl. No. 11/446,011, filed Jun. 2, 2006, and mailed from the USPTO dated Aug. 9, 2011, 10 pgs.
Notice of Allowance and Fee(s) Due for U.S. Appl. No. 11/524,602, filed Sep. 21, 2006, and mailed from the USPTO dated Aug. 6, 2013, 22 pgs.
Notice of Allowance and Fee(s) Due for U.S. Appl. No. 11/525,009, filed Sep. 21, 2006, and mailed from the USPTO dated Jul. 23, 2012, 19 pgs.
Notice of Allowance and Fee(s) Due for U.S. Appl. No. 12/243,852, filed Oct. 1, 2008, and mailed from the USPTO dated Feb. 27, 2013, 6 pgs.
Notice of Allowance and Fee(s) Due for U.S. Appl. No. 12/243,855, filed Oct. 1, 2008, and mailed from the USPTO dated Nov. 22, 2010, 8 pgs.
Notice of Allowance and Fee(s) Due for U.S. Appl. No. 12/243,855, filed Oct. 1, 2008, and mailed from the USPTO dated Oct. 28, 2010, 5 pgs.
Notice of Allowance and Fee(s) Due for U.S. Appl. No. 12/243,861, filed Oct. 1, 2008, and mailed from the USPTO dated Sep. 6, 2011, 10 pgs.
Notice of Non-compliant Amendment dated Dec. 12, 2006 in U.S. Appl. No. 10/350,810.
Permissions in the Java™ 2 SDK, printed Mar. 6, 2010, 45 pgs.
Restriction Requirement for U.S. Appl. No. 12/243,852, filed Oct. 1, 2008, and mailed from the USPTO dated Dec. 7, 2010.
Strebe, Matthew et al. MCSE: NT Server 4 Study Guide, Third Edition. 2000, Sybex Inc. Front matter, pp. 284-293, and 308-347 are included. Entire book cited, 36 pgs.
Supplemental Notice of Allowability for U.S. Appl. No. 12/243,852, filed Oct. 1, 2008, and mailed from the USPTO dated Mar. 19, 2013, 3 pgs.
Trademark Electronic Search System record for U.S. Appl. No. 76/375,405, Word Mark "Nitra".
"An Appointment with Destiny—The Time for Web-Enabled Scheduling has Arrived", Link Fall, 2007, 2 pages.
"How a Solution found a Problem of Scheduling Service Appointments", Automotive News, 2016, 4 pages.
"Openbay Announces First-of-its-Kind Connected Car Repair Service", openbay.com, Mar. 31, 2015, 14 pages.
"Service Advisor", Automotive Dealership Institute, 2007, 26 pages.

(56) References Cited

OTHER PUBLICATIONS

"XTime.com Web Pages", Jan. 8, 2015, 1 page.
"XTimes Newsletter", vol. 7, 2013, 4 pages.
U.S. Appl. No. 13/025,019, Notice of Allowance, dated Sep. 26, 2019, 9 pages.
U.S. Appl. No. 15/134,779, Advisory Action, dated Jul. 29, 2019, 6 pages.
U.S. Appl. No. 15/134,779, Non-Final Office Action, dated Nov. 19, 2019, 27 pages.
U.S. Appl. No. 15/134,793, Advisory Action, dated Jul. 29, 2019, 6 pages.
U.S. Appl. No. 15/134,793, Non-Final Office Action, dated Nov. 19, 2019, 31 pages.
U.S. Appl. No. 15/134,820, Notice of Allowance, dated Jan. 28, 2019, 7 pages.
U.S. Appl. No. 15/478,042, Non-Final Office Action, dated Oct. 10, 2019, 26 pages.
U.S. Appl. No. 15/478,048, Non-Final Office Action, dated Sep. 30, 2019, 30 pages.
U.S. Appl. No. 15/602,999, Notice of Allowance, dated Apr. 18, 2019, 6 pages.
U.S. Appl. No. 16/041,552, Non-Final Office Action, dated Dec. 27, 2019, 13 pages.
Bedell, Doug, Dallas Morning News, "I Know Someone Who Knows Kevin Bacon". Oct. 27, 1998. 4 pgs.
Chatterjee, Pallab, et al., "On-board diagnostics not just for racing anymore", EDN.com, May 6, 2013, 7 pages.
Croswell, Wayne, "Service Shop Optimiztion", Modern Tire Retailer, May 21, 2013, 7 pages.
Drawbaugh, Ben, "Automatic Link Review: an expensive way to learn better driving habits", Endgadget.com, Nov. 26, 2013, 14 pages.
Emmanuel, Daniel, "Basics to Creating an Appointment System for Automotive Service Customers", Automotiveservicemanagement.com, 2006, 9 pages.
Jenkins, Will, "Real-time vehicle performance monitoring with data intergrity", A Thesis Submitted to the Faculty of Mississippi State University, Oct. 2006, 57 pages.
Lavrinc, Damon, "First Android-powered infotainment system coming to 2012 Saab 9-3", Autoblog.com, Mar. 2, 2011, 8 pages.
Needham, Charlie, "Google Now Taking Appointments for Auto Repair Shops", Autoshopsolutions.com, Aug. 25, 2015, 6 pages.
openbay.com Web Pages, Openbay.com, retrieved from archive.org May 14, 2019, Apr. 2015, 6 pages.
openbay.com Web Pages, Openbay.com, retrieved from archive.org on May 14, 2019, Feb. 2014, 2 pages.
openbay.com Web Pages, Openbay.com, retrieved from archive.org, May 14, 2019, Mar. 2015, 11 pages.
Phelan, Mark, "Smart phone app aims to automate car repairs", Detroit Free Press Auto Critic, Mar. 31, 2015, 2 pages.
Pubnub Staff, "Streaming Vehicle Data in Realtime with Automatic (Pt 1)", Pubnub.com, Aug. 17, 2015, 13 pages.
Warren, Tamara, "This Device Determines What Ails Your Car and Finds a Repair Shop—Automatically", CarAndDriver.com, Apr. 8, 2015, 7 pages.
You, Song, et al., "Overview of Remote Diagnosis and Maintenance for Automotive Systems", 2005 SAE World Congress, Apr. 11-14, 2015, 10 pages.
U.S. Appl. No. 15/134,793, Notice of Allowance, dated Nov. 2, 2020, 13 pages.
U.S. Appl. No. 15/478,048, et al., Non-Final Office Action, dated Mar. 8, 2021, 69 pages.
U.S. Appl. No. 16/951,833, Notice of Allowance, dated Jun. 16, 2021, 14 pages.
Hu, Bo, "A Platform based Distributed Service Framework for Large-scale Cloud Ecosystem Development", IEEE Computer Society, 2015, 8 pages.
U.S. Appl. No. 16/951,833, et al., Non-Final Office Action, dated Feb. 4, 2021, 10 pages.
Clemens Grelck, et al.,"A Multithread Compiler Backend for High-Level Array Programming",2003.
Open Bank Project, et al., https://www.openbankproject.com/, retrieved Nov. 23, 2020, 10 pages.
Standards for Technology in Auto, et al., https://www.starstandard.org/, retrieved Nov. 23, 2020, 4 pages.
U.S. Appl. No. 15/134,779, Notice of Allowance, dated Sep. 9, 2020, 12 pages.
U.S. Appl. No. 15/478,042, Non-Final Office Action, dated Aug. 4, 2020, 42 pages.
http://web.archive.org/web/20050528073821/http://www.kbb.com/, 1 pg.
http://web.archive.org/web/20050531000823/http://www.carfax.com/, 1 pg.
IBM Tivoli Access Manager Base Administration Guide, Version 5.1. 2003, International Business Machines Corporation. Entire book enclosed and cited. 402 pgs.
Interconnection. (2003). In Roget's II The New Thesaurus. Boston, MA: Houghton Mifflin. Retrieved Jul. 16, 2009, from http://www.credoreference.com/entry/hmrogets/interconnection, 1 pg.
Internet Archive Dan Gillmor Sep. 1, 1996.
Internet Archive Wayback Machine, archive of LDAP Browser.com—FAQ. Archived Dec. 11, 2000. Available at <http://web.archive.org/web/200012110152/http://www.ldapbrowser.com/faq/faq.php3?sID=fe4ae66f023d86909f35e974f3a1ce>.
Internet Archive Wayback Machine, archive of LDAP Browser.com—Product Info. Archived Dec. 11, 2000. Available at <http://web.archive.org/web/200012110541/http://www.ldapbrowser.com/prodinfo/prodinfo.php3?sID=fe4ae66f2fo23d86909f35e974f3a1ce>.
Internet Archive: Audio Archive, http://www.archive.org/audio/audio-searchresults.php?search-@start=0&limit=100&sort=ad, printed May 12, 2004, 12 pgs.
Internet Archive: Democracy Now, http://www.archive.org/audio/collection.php?collection=democracy_now, printed May 12, 2004, 2 pgs.
Java 2 Platform, Enterprise Edition (J2EE) Overview, printed Mar. 6, 2010, 3 pgs.
Java version history—Wikipedia, the free encyclopedia, printed Mar. 6, 2010, 9 pgs.
Lee, Adam J. et al., "Searching for Open Windows and Unlocked Doors: Port Scanning in Large-Scale Commodity Clusters," Cluster Computing and the Grid, 2005. CCGrid2005. IEEE International Symposium on vol. 1; Publication Year: 2005.
Michener, J.R., et al., "Managing System and Active-Content Integrity," Computer; vol. 33, Issue: 7; Publication Year: 2000, pp. 108-110.
Non-Final Office Action for U.S. Appl. No. 10/350,795, filed Jan. 24, 2003, and mailed from the USPTO dated Dec. 26, 2008, 13 pgs.
Non-Final Office Action for U.S. Appl. No. 10/350,795, filed Jan. 24, 2003, and mailed from the USPTO dated Feb. 6, 2006, 11 pgs.
Non-Final Office Action for U.S. Appl. No. 10/350,795, filed Jan. 24, 2003, and mailed from the USPTO dated Jul. 22, 2009, 22 pgs.
Non-Final Office Action for U.S. Appl. No. 10/350,795, filed Jan. 24, 2003, and mailed from the USPTO dated Jun. 29, 2006, 11 pgs.
Non-Final Office Action for U.S. Appl. No. 10/350,795, filed Jan. 24, 2003, and mailed from the USPTO dated Mar. 12, 2007, 10 pgs.
Non-Final Office Action for U.S. Appl. No. 10/350,795, filed Jan. 24, 2003, and mailed from the USPTO dated May 29, 2008, 10 pgs.
Non-Final Office Action for U.S. Appl. No. 10/350,795, filed Jan. 24, 2003, and mailed from the USPTO dated Nov. 1, 2010, 19 pgs.
Non-Final Office Action for U.S. Appl. No. 10/350,796, filed Jan. 24, 2003 and mailed from the USPTO dated May 19, 2005, 7 pgs.
Non-Final Office Action for U.S. Appl. No. 10/350,810, filed Jan. 24, 2003, and mailed from the USPTO dated Apr. 17, 2007, 12 pgs.
Non-Final Office Action for U.S. Appl. No. 10/350,810, filed Jan. 24, 2003, and mailed from the USPTO dated Dec. 9, 2005, 14 pgs.
Non-Final Office Action for U.S. Appl. No. 10/350,810, filed Jan. 24, 2003, and mailed from the USPTO dated Sep. 22, 2004, 10 pgs.
Non-Final Office Action for U.S. Appl. No. 10/351,465, filed Jan. 24, 2003, and mailed from the USPTO dated Jul. 27, 2004, 9 pgs.
Non-Final Office Action for U.S. Appl. No. 10/351,606, filed Jan. 24, 2003 and mailed from the USPTO dated Dec. 19, 2005, 7 pgs.

(56) References Cited

OTHER PUBLICATIONS

Non-Final Office Action for U.S. Appl. No. 10/351,606, filed Jan. 24, 2003 and mailed from the USPTO dated May 17, 2004, 5 pgs.
Non-Final Office Action for U.S. Appl. No. 10/351,606, filed Jan. 24, 2003, and mailed from the USPTO dated Dec. 19, 2005, 8 pgs.
Non-Final Office Action for U.S. Appl. No. 10/351,606, filed Jan. 24, 2003, and mailed from the USPTO dated May 17, 2004, 6 pgs.
Non-Final Office Action for U.S. Appl. No. 10/665,899, filed Sep. 18, 2003, and mailed from the USPTO dated Aug. 30, 2010, 23 pgs.
Non-Final Office Action for U.S. Appl. No. 10/665,899, filed Sep. 18, 2003, and mailed from the USPTO dated Nov. 13, 2008, 11 pgs.
Non-Final Office Action for U.S. Appl. No. 10/665,899, filed Sep. 18, 2003, and mailed from the USPTO dated Sep. 14, 2009, 14 pgs.
Non-Final Office Action for U.S. Appl. No. 10/665,899, filed Sep. 18, 2003, and mailed from the USPTO dated Sep. 17, 2007, 11 pgs.
Non-Final Office Action for U.S. Appl. No. 11/149,909, filed Jun. 10, 2005, and mailed from the USPTO dated May 13, 2008, 14 pgs.
Non-Final Office Action for U.S. Appl. No. 11/149,909, filed Jun. 10, 2005, and mailed from the USPTO dated May 6, 2009, 6 pgs.
Non-Final Office Action for U.S. Appl. No. 11/414,939, filed May 1, 2006, and mailed from the USPTO dated Jul. 19, 2010, 7 pgs.
Non-Final Office Action for U.S. Appl. No. 11/414,939, filed May 1, 2006, and mailed from the USPTO dated Mar. 9, 2010, 11 pgs.
Non-Final Office Action for U.S. Appl. No. 11/442,821, filed May 30, 2006, and mailed from the USPTO dated Jun. 1, 2011, 23 pgs.
Non-Final Office Action for U.S. Appl. No. 11/442,821, filed May 30, 2006, and mailed from the USPTO dated Nov. 12, 2009, 19 pgs.
Non-Final Office Action for U.S. Appl. No. 11/442,821, filed May 30, 2006, and mailed from the USPTO dated Sep. 3, 2008, 14 pgs.
Non-Final Office Action for U.S. Appl. No. 11/446,011, filed Jun. 2, 2006, and mailed from the USPTO dated Mar. 1, 2011, 15 pgs.
Non-Final Office Action for U.S. Appl. No. 11/446,011, filed Jun. 2, 2006, and mailed from the USPTO dated Nov. 27, 2009, 14 pgs.
Non-Final Office Action for U.S. Appl. No. 11/446,011, filed Jun. 2, 2006, and mailed from the USPTO dated Nov. 27, 2009, 24 pgs.
Non-Final Office Action for U.S. Appl. No. 11/524,602, filed Sep. 21, 2006, and mailed from the USPTO dated Dec. 11, 2009, 20 pgs.
Non-Final Office Action for U.S. Appl. No. 11/524,602, filed Sep. 21, 2006, and mailed from the USPTO dated Nov. 14, 2011, 19 pgs.
Non-Final Office Action for U.S. Appl. No. 11/525,009, filed Sep. 21, 2006, and mailed from the USPTO dated Aug. 10, 2011, 18 pgs.
Non-Final Office Action for U.S. Appl. No. 11/525,009, filed Sep. 21, 2006, and mailed from the USPTO dated Dec. 16, 2009, 20 pgs.
U.S. Appl. No. 15/478,048, Final Office Action, dated Sep. 17, 2021, 32 pages.
U.S. Appl. No. 16/041,552, Notice of Allowance, dated Sep. 30, 2021, 17 pages.
U.S. Appl. No. 15/478,042, Non-Final Office Action, dated Nov. 19, 2021, 45 pages.
U.S. Appl. No. 17/156,254, Non-Final Office Action, dated Feb. 25, 2022, 18 pages.

\* cited by examiner

SERVERS, SYSTEMS, AND METHODS FOR SINGLE SIGN-ON OF AN AUTOMOTIVE COMMERCE EXCHANGE

RELATED APPLICATIONS

This application is a continuation in part of U.S. patent application Ser. No. 16/041,552, which was filed on Jul. 20, 2018 and is titled SYSTEMS AND METHODS FOR AN AUTOMOTIVE COMMERCE EXCHANGE, and which claims priority to U.S. Provisional Patent Application 62/646,199, which was filed on Mar. 21, 2018, the entire disclosures of each of which are hereby incorporated herein by reference.

TECHNICAL FIELD

The disclosure relates to networks and software for automotive commerce exchange.

DETAILED DESCRIPTION

Figure 1:
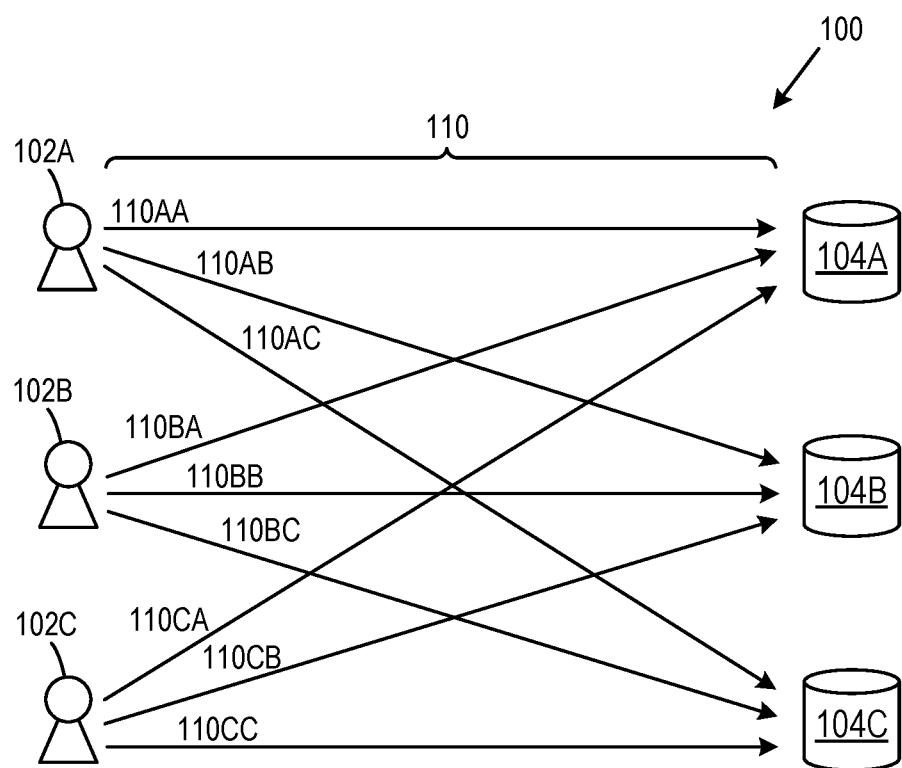
FIG. 1 is a simplified block diagram of an example of a system illustrating interfaces between developers and Dealership Management Systems (DMS) providers.

Disclosed are systems and methods of an automotive commerce exchange that is an open platform and enables creative third-party developers, independent software vendors, Original Equipment Manufacturers (OEMs), and dealerships to consume Application Programming Interfaces (APIs), and develop and market solutions to improve efficiency and innovation in the industry.

The past decade has been a period of growth for the automotive industry. The benefits of that growth, however, have been unevenly distributed. This growth has also masked headwinds that the industry must come to terms with soon. Some of these headwinds include complexity and cost pressure, diverging markets, digital demands, and shifting industry landscapes. Each of these items is discussed below:

Complexity and Cost Pressure

There will continue to be more platform sharing and more modular systems for automobiles. Regulatory pressures, however, will tighten, and prices in established markets will be flat.

Diverging Markets

OEMs will need to adapt to regional and segmented patterns of supply and demand with respect to production, supply chain, and product portfolios. Also, OEMs will need to be ready to embrace the growth opportunities in the Chinese after-sales market.

Digital Demands

Consumers will continue to want more connectivity and will increasingly use digital sources to make their purchasing decisions.

Shifting Industry Landscapes

This relates to creating more value with alternative powertrain technologies that can emerge, and satisfying consumer demand around safety and entertainment. OEMs will need to deal with the restructuring that must continue to occur in Europe to have capacity match demand and embrace the increasing competition that will occur in China.

Stakeholders in the automotive industry that will be impacted by these items include retailers, consumers, and OEMs, as discussed below:

Retailers

Retailers are facing, among other things, the following headwinds:
Declining Seasonally Adjusted Annual Rate (SAAR),
An inventory supply that is greater than 70 days,
New car incentives that are greater than 10 percent of Manufacturer Suggested Retail Price (MSRP),
Margin compression, and
Market consolidation.

Consumers

Consumers are shifting toward digital tools when shopping for automobiles, are demanding a better end-to-end retail experience, and are driving omni-channel commerce and online-to-offline (O2O) experience.

OEMs

OEMs are investing more in Information Technology (IT) as they strive to control more of the consumer experience to compete with the threat that comes from direct distribution.
Other influences in today's automotive industry include:
New ownership and transportation models are emerging,
Disruptive entrants are on the horizon,
Independent point solutions are not unlocking value,
Sales associate productivity has not improved in 25 years, and
Sales processes are more complicated today for sales associates and customers and, as a result, still take too long.

With all these issues in mind, if a dealer from 1988 were dropped into a dealership in 2018, he or she may be both bewildered and amazed by the advancement of technology, manufacturing capability, safety, efficiency, and power that are available in today's automobiles. If the 1988 dealer were asked to actually sell a car, however, he or she would be in familiar territory. For example, scheduling and preparing a car for a test drive is just as labor-intensive and inefficient today as it was in 1988. The time it takes to sell a car and the number of people to accomplish that sale and go through approval, desking, Finance and Insurance (F&I), titling, and delivery are almost identical to similar processes of 1988.

Also, the dealer would actually find that the sales value chain is just as fragmented and disconnected today as it was in 1988.

There are several reasons why current technological advancements have failed to improve automobile sales processes. First, current solutions are one-off, and one size does not fit all. Also, it is currently very difficult for software application developers to integrate with DMSs. Furthermore, mega products rarely satisfy needs with best-in-class experience across the board. On top of all this, contracting and partnership agreements are slow and manual, and ultimately result in a point-to-point solution with a poor developer experience. There is currently no one place that can be a single source of information for managing transactions between different services. While existing partner programs work and are a strong foundation, these programs enable a limited value exchange when it comes to revenue, data sharing, and business value because of these constraints. A Third-Party Access Program (3PA) that offers integration that is point-to-point, and not generalized to go across the systems, results in a manual enablement process without a marketplace to facilitate e-commerce and without a central orchestration engine.

FIG. 1 is a simplified block diagram of an example of a system 100 illustrating interfaces between developers 102A, 102B, and 102C (sometimes referred to herein collectively as "developers" 102 and individually as "developer" 102) and DMS providers 104A, 104B, and 104C (sometimes referred to collectively herein as "DMS providers" 104 or individually as "DMS provider" 104). Each developer 102 would have to develop its own APIs 110AA, 110AB, 110AC, 110BA, 110BB, 110BC, 110CA, 110CB, 110CC (sometimes referred to herein collectively as "APIs" 110 or individually as "API" 110) to interface with each of the DMS providers 104.

The APIs 110 are not standardized, which is why the developers 102 would develop their own APIs 110 for each of the DMS providers 104. Developing different and separate APIs 110 for each of the DMS providers 104 incurs a high cost and consumes a significant amount of time of the developers 102. As a result, financial and time resources of the developers 102 are often tied up with these APIs 110 and little or no resources may be left for new innovation.

Systems and methods disclosed herein address these challenges and enable end-to-end automotive commerce. Systems and methods disclosed herein power an open platform that allows for easy integration of capabilities to increase sales, operational efficiency, and profitability for dealers. Embodiments of the disclosure enable end-to-end e-commerce for the automotive industry via an open platform. Also, systems and methods disclosed herein provide standardized APIs to reduce the amount of resources developers invest in APIs, leaving more resources for innovation in other areas.

Embodiments of the disclosure include one or more of the following:
- Standardized APIs to enable third-party developers to access DMS and other source-of-truth systems, in contrast with conventional APIs, which are not consistent or standardized and make developers' lives difficult and slow down the rate of innovation.
- Best-in-class software modules to fulfill a given business workflow and enable consumers of the modules, such as dealers, dealer group IT professionals, and end users, to avail themselves of the flexibility afforded by these modules.
- Flexibility to enable OEMs to innovate regardless of the software vendors being used by their dealerships.
- Aggregated automotive APIs in one place to enable the community to innovate.
- Aggregated automotive forums, blogs, or both in one place to enable the community to collaborate.
- A marketplace that offers the capability to list, market, sell, and buy the solutions and enable seamless automated e-commerce.
- Transaction-aware smart orchestration to power up innovation and customer experience on the platform.

Facilitating the creation of an exchange that allows for standardized hosting of APIs and Software Development Kits (SDKs) that can be leveraged by various parties (e.g., developers, dealers, designated agents, OEMs, and industry verticals) through an automated brokering process enables a developer network that allows for easy creation of solutions leveraging these APIs through a modern developer experience, according to various embodiments disclosed herein.

Embodiments disclosed herein can be hosted and distributed in a marketplace. Because the exchange is the principal interface point for data, multiple value and revenue chains may be created for OEMs, dealer IT, and third-party Independent Software Venders (ISVs). Whereas in previous systems, point-to-point solutions used custom contract negotiation and bespoke API enablement, now a turnkey, self-service process allows a developer or OEM to publish APIs and solutions once. As a result, these APIs and solutions can serve an unlimited number of customers.

Since the exchange is the intersection point for transactions and data interchange, true workflow across applications and services may be enabled. This paves the way for the future of automotive commerce by creating opportunities for the developers, dealer IT, and third-party ISVs to create powerful solutions that orchestrate activities via simple enablement and integration, such as notifications, expert recommendations powered by machine learning, and targeting advertising and cross-selling based on geographic, psychographic, and other available consumer data.

As previously discussed, developers, dealers, designated agents, OEMs, and industry verticals that want to participate in automotive commerce space may be enabled to participate in automotive commerce using embodiments disclosed herein. These embodiments provide simple-to-use, scalable, and secure access to automotive commerce.

There has never previously been an easy way to combine and integrate a best-in-class solution a dealer needs without an often prohibitive amount of custom development and integration. Embodiments disclosed herein remove that barrier from dealers, allowing them to pick the solutions and services they want. Embodiments disclosed herein also make changes to those services and substitution of those services for other services simple administrative functions. If widespread implementation of these embodiments occurs in the industry, this should create positive competitive market forces and raise the quality bar of widespread offerings in the industry.

Embodiments of the disclosure enable API publishers to create specifications and securely deploy and publish the specifications at scale. Embodiments of the disclosure also provide analytics and operational tools to enable API publishers to create correct API specifications that will work in the exchange.

Also, developers will have access to the same experience, where they can register for the exchange, develop offerings with APIs and design, and securely deploy and publish those APIs in the marketplace. Developers have the flexibility of creating solutions that work with multiple APIs so that different dealers that use potentially competing services can still take advantage of the same developer solution.

Furthermore, dealer IT can go into the marketplace and see the solutions that are available in the marketplace. Once parties associated with dealer IT are authenticated, they can enable entitlements that integrate their dealer services with solutions that are purchased and managed in the marketplace. At any time, they can return to the marketplace and alter enablements by either stopping or switching services. The marketplace may also support orchestration services that will allow dealer IT to easily enhance workflow with what today would be considered expensive and custom point-to-point solutions, which in many cases are not even possible without a common exchange and standards.

These scenarios illustrate how embodiments disclosed herein enable a seamless customer experience that drives value across an entire ecosystem. Platforms according to these embodiments are designed to enable network effects for dealers and developers at scale.

A few example embodiments disclosed herein include a connected store (OEM), a connected car end-to-end (dealer), and inventory management (ISV). Each of these example embodiments will be discussed below.

Connected Store (OEM)

OEMs often have access to large amounts of powerful data and insights about consumers and their propensity to buy or update a vehicle based on dealer service utilization. An OEM could develop a set of APIs and make them accessible through the marketplace. The OEM could mandate that its dealer networks use the APIs and provide a consistent set of experience and data across multiple channels. Examples of channels that could facilitate provision of experience and data include CDK Global® Sites, third-party portal sites, dealer sites, and own OEM sites (when it comes to inventory, pricing, trade-in payments, credit and F&I). These services could be easily integrated into third-party tools like Deal Dash® and integrate with unique in-store capabilities such as Customer Relationship Management (CRM), desking solutions, and customer showroom tools. The data exchange and configuration would be facilitated by the marketplaces disclosed herein (e.g., CDK Global's Zebrafish Marketplace). OEMs currently do not have the capability to practice embodiments disclosed herein because hundreds of custom solutions would be needed to support their dealer networks. With marketplaces disclosed herein, it quickly becomes possible to write API specifications and make the specifications available through the Zebrafish Developer Network, work with developers to create solutions for their dealer markets, and have dealer IT drive the solution entitlement through the marketplace.

Connected Car End-to-End (Dealer)

Another example is customers getting a service notification through vehicle telemetry in their connected car. Marketplaces disclosed herein could broker data exchange between the consumer and dealer operations around quoting, service pricing, and repair order management. These marketplaces could also drive the integration with a dealer's connected lot and all of its service lane capabilities, such as scheduling, lane, inspection, notification, payment, and parts and inventory management. Today these scenarios have multiple break points because existing systems only allow for point-to-point integrations. Marketplaces disclosed herein, however, could enable a true workflow and orchestration with notification services, to provide a seamless experience to the customer.

Inventory Management (ISV)

Marketplaces disclosed herein can also enable scenarios around inventory management and give dealers a greater reach and funnel by driving integration of inventory and quoting with a third-party website. By way of non-limiting examples, a consumer may be enabled thereby to initiate a geographic search of automobiles through integration with APIs around Mobile Visual Search (MVS) and quoting, generating a penny-accurate quote that a consumer could take right to a dealer. Orchestration could provide extra value with this experience by offering turn-by-turn directions to the dealer of choice. Because all data may pass through the exchange, dynamic campaign and spot advertising may be supported based on where a customer is located geographically. Once a customer is at a dealer, the same visibility into data may guide a dealer into the most appropriate service upselling based on search parameters the customer entered in a third-party website.

These are just a few examples of what the marketplaces disclosed herein can enable today with services like Standard Positioning Service (SPS), MVS, quoting, and appointments. As marketplaces disclosed herein gain traction, thousands of partners will be able to independently develop and consume APIs to connect with dealers through the marketplace exchange. These examples illustrate how Zebrafish enables a seamless customer experience that drives value across an entire ecosystem and enables network effects for dealers and developers at scale.

Additional features that may be included in the marketplaces disclosed herein include comprehensive and open platform integration, proven enterprise-level support that is responsive and reliable, and enterprise-grade security to enable data transfer between data sources and applications.

Whereas in the past a point-to-point solution via a partner interface process (PIP) required custom contract negotiation and bespoke API enablement, embodiments disclosed herein provide a turnkey, self-service process that allows a developer or OEM to publish APIs and solutions once that can serve an unlimited number of customers. This will create value and revenue across the ecosystem by removing friction in access to data that traditional partnership efforts still use.

In some embodiments, the marketplace may include user interfaces configured to enable parties to register with the exchange. The user interfaces may enable these parties to provide APIs on the exchange.

As used herein, the term "module" refers to a software module including computer-readable instructions stored on one or more data storage devices and configured to instruct one or more processors to perform functions of the module.

In some embodiments, a computer server includes: one or more processors of an automotive commerce exchange platform and one or more computer-readable storage media operably coupled to the one or more processors. The one or more computer-readable storage media have computer-readable instructions stored thereon. The computer-readable instructions are configured to instruct the one or more processors to execute a plurality of different software interfaces with a plurality of different DMS systems and provide a standardized software interface. The standardized software interface is configured to enable communication between the one or more processors of the automotive commerce exchange platform and a plurality of different devices of entities involved with an automotive market. The standardized software interface is also configured to enable the plurality of different devices access to each of the plurality of different DMS systems, independent of local software interfaces of the plurality of different devices with each of the different DMS systems.

In some embodiments, the entities involved with the automotive market include a dealer, a software developer of automotive dealer software, an automotive service provider, and a dealership software system integrator.

In some embodiments, the computer-readable instructions are further configured to instruct the one or more processors to enable the plurality of different devices to test software interfaces between the one or more processors and the plurality of DMS systems without actually accessing the plurality of DMS systems during the test.

In some embodiments, the computer-readable instructions are further configured to enable users of the plurality of different devices to set terms and conditions, pricing, guidelines, or combinations thereof for software interfaces provided by the users.

In some embodiments, the computer-readable instructions are further configured to instruct the one or more processors to provide a developer network configured to enable software developers to explore the various software interfaces that are available through the automotive commerce exchange platform via the plurality of different devices.

In some embodiments, the developer network is further configured to enable the software developers to try to test the available software interfaces.

In some embodiments, the developer network is further configured to enable the software developers to access guidelines and access terms and conditions associated with the available software interfaces.

In some embodiments, the developer network includes a forum for developers of APIs across multiple different DMS systems to participate in online discussions.

In some embodiments, the computer-readable instructions are further configured to instruct the one or more processors to provide an environment (e.g., an online environment). In this environment, software provided through the automotive commerce exchange platform (e.g., software that utilizes at least one of the plurality of different interfaces) can be used by end users.

In some embodiments, the automotive commerce exchange platform is configured to serve as an interface for subscription and billing between developers of software provided by the automotive commerce exchange platform, providers of the plurality of different software interfaces, and the end users.

In some embodiments a computer server includes one or more communication devices and one or more processors. The one or more communication devices are configured to communicate with a plurality of different DMS systems and a plurality of different automotive software developer devices. The one or more processors are configured to execute different software interfaces to access the plurality of different DMS systems through the communication device, and provide a developer network configured to enable software developers to explore, using the plurality of different automotive software developer devices, the different software interfaces that are available through the automotive commerce exchange platform via the plurality of different devices for use in development of automotive software by the software developers.

In some embodiments, the developer network is also configured to enable the software developers to test use of the different software interfaces by their automotive software without actually accessing any of the plurality of different DMS systems.

In some embodiments, the developer network is also configured to provide an online forum to facilitate online discussions regarding automotive software development.

In some embodiments, the developer network is also configured to enable the software developers to set terms and conditions, pricing, or both, which are associated with their automotive software that is part of the automotive commerce exchange platform.

In some embodiments, the one or more processors are also configured to provide a marketplace including an online environment to enable end users of the automotive software to use the automotive software of the automotive commerce exchange platform.

In some embodiments, a computer server includes one or more communication devices and one or more processors. The one or more communication devices are configured to communicate with a plurality of different DMS systems and a plurality of different automotive software developer devices. The one or more processors are configured to execute different software interfaces to access the plurality of different DMS systems through the communication device. The one or more processors are also configured to provide a marketplace including an online environment to enable end users of automotive software to access the plurality of different DMS systems of the automotive commerce exchange platform using the different software interfaces.

In some embodiments, the one or more processors are also configured to provide online management of subscriptions and billing between developers of the automotive software, providers of the different software interfaces, and the end users.

In some embodiments, the one or more processors are configured to enable the end users to electronically search through the automotive software of the automotive commerce exchange platform.

In some embodiments, the one or more processors are configured to enable the end users to electronically search through the automotive software by categories of the automotive software.

In some embodiments, categories of the automotive software include at least one category taken from the group consisting of repair order software, electronic payment software, automobile quote software, DMS software, tax engine software, automobile sales software, automobile parts software, automotive-related entity accounting software, and automotive-related entity employee software.

Figure 2:
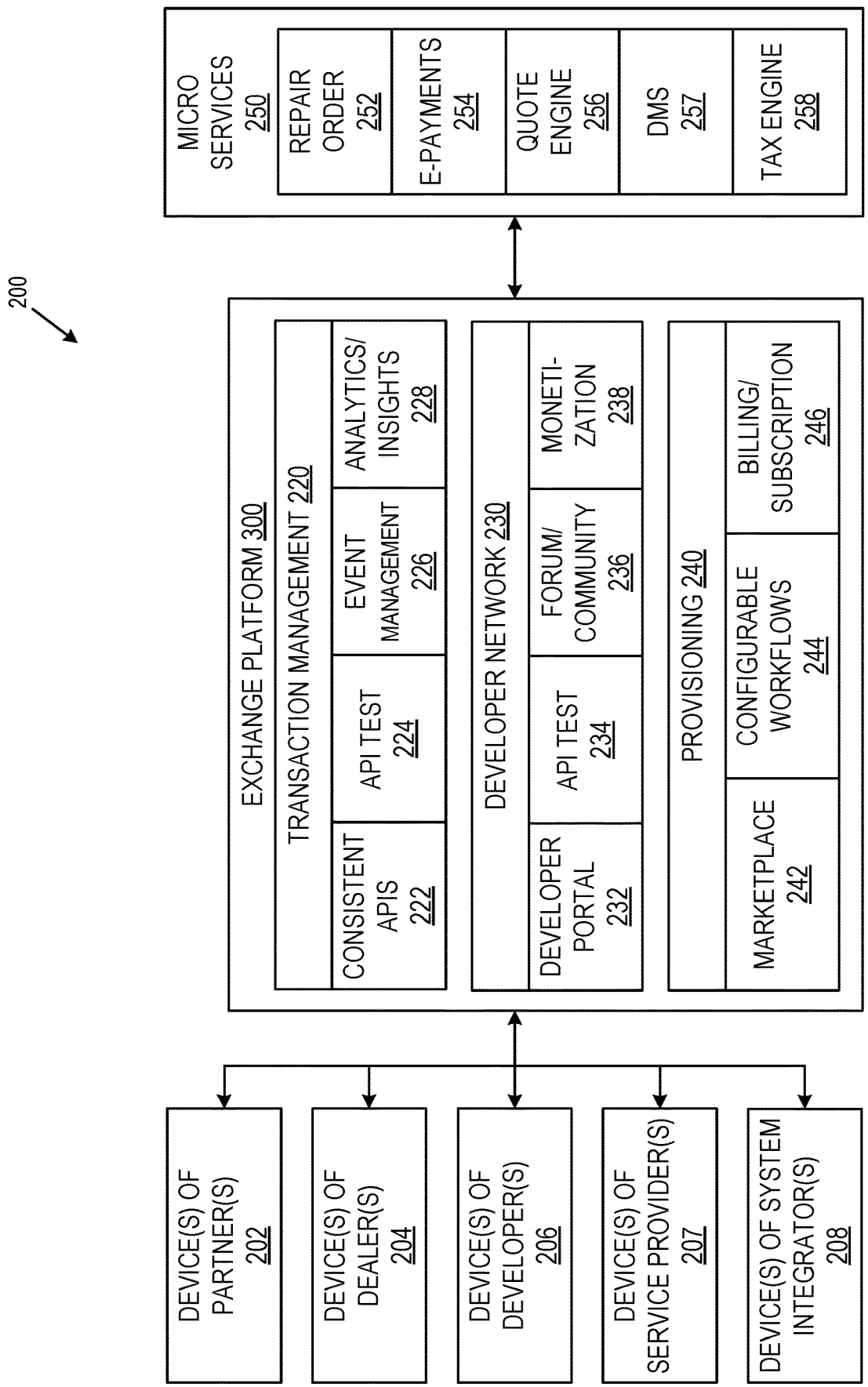
FIG. 2 is a simplified block diagram of an automotive commerce system, according to some embodiments.

FIG. 2 is a simplified block diagram of an automotive commerce system 200, according to some embodiments. The system 200 includes an exchange platform 300, one or more micro services 250, one or more devices 202 of one or more partners (e.g., parties that partner with a developer of the exchange platform 300), one or more devices 204 of one or more dealers (e.g., dealers of vehicles such as automobiles), one or more devices 206 of one or more developers (e.g., an independent sole proprietor of the developer of the exchange platform), one or more devices 207 of one or more service providers (e.g., an independent software development group that services the automotive industry), and one or more devices 208 of one or more system integrators (e.g., consultants that assist vehicle dealerships to implement automotive sales software).

The exchange platform 300 includes a transaction management layer 220 ("transaction management" 220), a developer network layer 230 ("developer network" 230), and a provisioning layer 240 ("provisioning" 240). The transaction management 220 includes consistent APIs 222, API test 224, event management 226, and analytics/insights 228. The consistent APIs 222 include standardized APIs (e.g., pre-provided APIs) that enable parties to access information from other parties (e.g., to enable a consumer to access appointments at a vehicle repair shop or automobile dealer, etc.). As a result, developers do not need to spend valuable time and money resources on developing APIs because these APIs are provided.

The API test 224 provides developers with example data that is similar to that which may be extracted by APIs of the consistent APIs 222. As a result, a developer may be enabled to test software using the example data without actually connecting to an actual party and actually accessing the live data at the actual party. This makes the development process simpler because the developer does not have to waste resources setting up trial accounts with the various parties participating in the exchange platform 300 in order to test software that is under development.

The analytics/insights 228 provide analytics for various parties. For example, analytics may be provided regarding the party that provides the exchange platform 300. Also by way of non-limiting example, the analytics/insights 228 may be configured to provide analytics regarding developers that provide APIs to the exchange platform 300. As a further, non-limiting example, the analytics/insights 228 may be configured to provide analytics regarding consumers of the APIs (e.g., how much money a developer owes to the platform, how many times a party used an API, etc.). As a result, insights for usage of the exchange platform 300 by various parties may be provided to various parties.

The developer network 230 provides the capability to build specifically for developers to make their onboarding frictionless, and provide for seamless onboarding and a seamless experience for developers. The developer network 230 includes a developer portal 232, the API test 224 (as discussed above), a forum/community 236, and a monetization 238. The developer portal 232 enables developers to go online and explore the various APIs that are available through the exchange platform 300, test these available APIs (e.g., using the API test 224), access API guidelines, and access terms and conditions for the APIs.

The forum/community 236 enables parties to post questions or comments online to spur discussions about these questions or comments. For example, if a party has a question, the party may post the question online and other parties can view and respond to the question.

The monetization 238 provides developers with a way to benefit from the APIs/software that they provide to the exchange platform 300. By way of non-limiting example, a developer may be enabled to submit an API, set his/her own terms and conditions, and set his/her own pricing structure (e.g., price for a subscription or purchase, etc.). Once the API is submitted, an administrator of the exchange platform 300 can review and approve or decline the API, terms and conditions, pricing structure, privacy policy, etc. Once approved, anybody can access the API, and the developer can start making money based on his/her own pricing structure.

The provisioning 240 includes a marketplace 242, configurable workflows 244, and billing/subscription 246. The marketplace 242 is an environment where software that utilizes one or more APIs provided by the exchange platform 300 can be used or consumed by the end user. The marketplace 242 may enable the end user to search through various software solutions (e.g., by category), try the solutions to see whether the solutions serve the desired purpose, and enable the solutions. The configurable workflows 244 enable the end users to configure their enabled solutions.

Once a solution is enabled in the marketplace 242, the billing/subscription 246 is configured to bill the end user for the use of the enabled solutions. The billing/subscription 246 may be configured to provide the funds owed to the developers of the enabled software solution and the providers of the APIs used by the enabled software solution as the end user uses the enabled software solution. In other words, the exchange platform 300 may serve as a financial bank between the developers, the API providers, and the end users.

The micro services 250 include examples of APIs provided by the API providers. For example, the micro services 250 include a repair order API 252, an e-payments API 254, a quote engine API 256, a DMS API 257, and a tax engine API 258. These examples should not be viewed as limiting. Rather, any API that facilitates any exchange of information between any of the parties discussed above may be used by the exchange platform 300.

The system 200 is secure, enables self-service, and is extensible, highly available, and flexible.

Communication between the exchange platform 300 and the devices 202, 204, 206, 207, and 208 of the partners, the dealers, the developers, the service providers, and the system integrators, respectively, may be performed using one or more networks (e.g., the Internet, cellular data networks, wide area networks (WANs), local area networks (LANs), personal area networks (PANs), switched networks (e.g., publicly switched networks), cloud networks, wireless networks, wired networks, or combinations thereof). Also, any of the blocks 202-258 illustrated in FIG. 2, or in any of the subsequent figures may indicate a single device or a distribution of devices, or may be a part of the same device as one or more others of the blocks 202-258 in a variety of centrally located architectures, distributed architectures, other architectures, or combinations thereof.

Furthermore, each of the exchange platform 300, the micro services 250, and the devices 202, 204, 206, 207, 208 may include one or more computing devices (e.g., desktop computers, laptop computers, tablet computers, smart phones, point-of-sale (POS) stations, other electronic devices, or combinations thereof). A computing device may include at least a processor or processors operably coupled to a computer-readable storage medium or media (e.g., a non-transitory computer-readable storage medium such as a volatile or non-volatile data storage device). The processor may include a central processing unit (CPU), a microcontroller, a field programmable gate array (FPGA), a programmable logic controller (PLC), other programmable circuitry, or combinations thereof. The computing device may also include one or more communication devices (e.g., wireless and/or wired network communication devices such as WiFi communication devices, cellular data communication devices, Ethernet communication devices, Bluetooth communication devices etc.) operably coupled to the processor. The one or more communication devices are configured to communicate through WANs such as the Internet, LANs, virtual private networks (VPNs), PANs such as Bluetooth or Zigbee networks, cloud networks, other networks, or combinations thereof.

Figure 3:
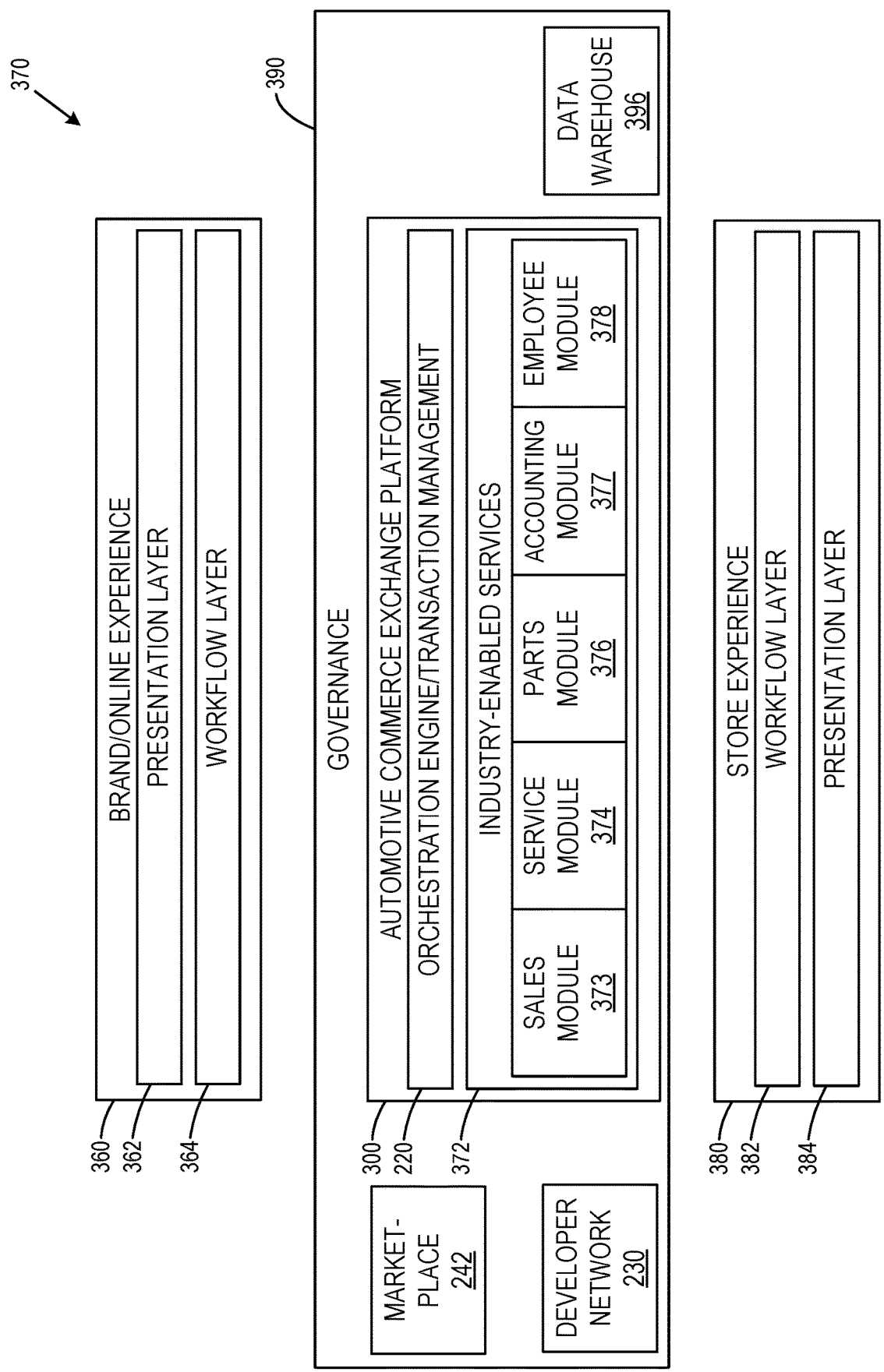
FIG. 3 is a simplified diagram of a system including an exchange platform of FIG. 2, according to some embodiments.

FIG. 3 is a simplified diagram of a system 370 including the exchange platform 300 of FIG. 2, according to some embodiments. The system 370 includes a governance system 390, a brand/online experience 360, and a store experience 380. The governance system 390 includes the automotive commerce exchange platform 300, which is discussed in more detail above with reference to FIG. 2. As discussed above, the exchange platform 300 includes the marketplace 242, the developer network 230, and the orchestration engine/transaction management 220. The exchange platform 300 also includes industry-enabled services 372 and a data warehouse 396.

The industry-enabled services 372 include services provided by the exchange platform 300 for the automotive industry. These services may include software-related services using software modules developed by developers in the automotive software space using APIs provided through the automotive commerce exchange platform 300. By way of non-limiting example, the industry-enabled services 372 may include a sales module 373, a service module 374, a parts module 376, an accounting module 377, and an employee module 378. It will be apparent to those of ordinary skill in the art that many other modules for industry-enabled services 372 may be included within the scope of the present disclosure.

The data warehouse 396 includes data indicating, at a high level, information corresponding to products and information that are provided through the exchange platform 300. This data may be used by the exchange platform 300 to make high-level decisions, such as management of product, financial, and data flows through the exchange platform 300. By way of non-limiting example, the data warehouse 396 may include information indicating APIs provided through the exchange platform 300, software products provided and operated using the exchange platform 300, and information relevant to making approval decisions for APIs and software products to be distributed through the exchange platform 300.

The brand/online experience 360 includes a presentation layer 362 and a workflow layer 364. The presentation layer 362 is configured to present the APIs and service of the exchange platform 300 in a Web or Internet setting. As a result, the presentation layer 362 may include websites having Uniform Resource Locators (URLs) to enable consumers to access the exchange platform 300 through web browser software executed by personal electronic devices (e.g., personal computers, laptop computers, tablet computers, smartphones, etc.).

The store experience 380 includes a workflow layer 382 and a presentation layer 384 similar to the workflow layer 364 and the presentation layer 362 of the brand/online experience 360. One difference, however, is that the presentation layer 384 may focus more on presenting the APIs and services of the exchange platform 300 in a store environment (e.g., in an automobile dealership). In such embodiments, the presentation layer 384 may include a VPN to enable consumers of the exchange platform's 300 products to access the exchange platform 300 through in-store devices (e.g., point-of-sale systems, dealership computer systems and devices, etc.). This access to the exchange platform 300 may be provided using a thin client or thick client architecture. As illustrated in FIG. 3, in-store and out-of-store workflow layers 364, 382 are intertwined through a common exchange (the exchange platform 300), enabling end-to-end automotive commerce.

As previously discussed with respect to FIG. 1 above, without the system 370 of FIG. 3 and the exchange platform 300 of FIGS. 2 and 3, developers have been forced to provide different APIs to interface with each different DMS provider. The exchange platform 300 reduces or eliminates this need, as will be discussed in more detail in FIG. 4.

Figure 4:
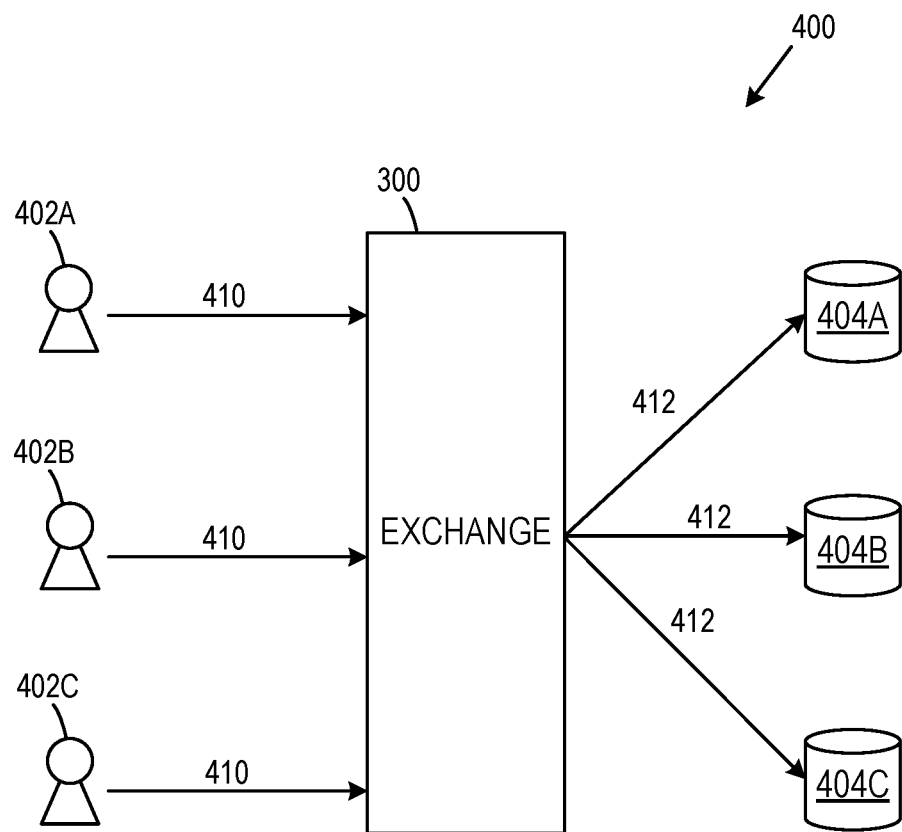
FIG. 4 is a simplified block diagram of an example of a system of interfacing with multiple DMS providers, according to some embodiments.

FIG. 4 is a simplified block diagram of an example of a system 400 of interfacing with multiple DMS providers, according to some embodiments. The system 400 includes developers 402A, 402B, and 402C (sometimes referred to herein together as "developers" 402 and individually as "developer" 402), the exchange platform 300 of FIGS. 2 and 3, and DMS providers 404A, 404B, and 404C (sometimes referred to herein together as "DMS providers" 404 and individually as "DMS provider" 404). The exchange platform 300 is configured to enable end-to-end automotive commerce through a standard set of interfaces 410 that enables applications to connect with any DMS provider 404. By way of non-limiting example, the interfaces 410 may include 3PAs, which may be developed by an entity managing the exchange platform 300 or by third parties that develop the 3PAs according to standards provided by the entity managing the exchange platform 300. The exchange platform 300 then interfaces with the DMS providers 404 using APIs 412 specific to those DMS providers 404.

Also, the system 400 serves as the foundation of a first-class developer experience. For example, the developers 402A, 402B, and 402C do not have to know the requirements of developing APIs 412 with the DMS providers 404 and can write the code for the interfaces 410 just once, in contrast to several APIs 110 as discussed above with reference to FIG. 1. As another example, the developers 402 may employ a consistent naming convention to understand how interfaces 410 can be interoperable.

The system 400 also enables third-party developers 402 to access DMS providers 404 through standard interfaces 410. The system 400 provides dealers the flexibility to use best-in-class modules to fulfill a given business workflow. The system 400 enables OEMs to innovate regardless of the software vendors being used by their dealerships. Furthermore, knowing the API definition and naming conventions will allow big data predictive analytical insights (e.g., appointment name must be consistent across the exchange platform 300 to enable knowledge that it is an appointment). Furthermore, the system 400 enables a single party to own the entire automotive transaction.

Guiding principles for embodiments disclosed herein may include one or more of the following:
A world-class developer experience;
Cloud native patterns, practices, and technology;
A focus on interactions in the network;
Transactions with persistent data-enabled powerful insights;
Curation as the new quality control; and
End-to-end security.

Figure 5:
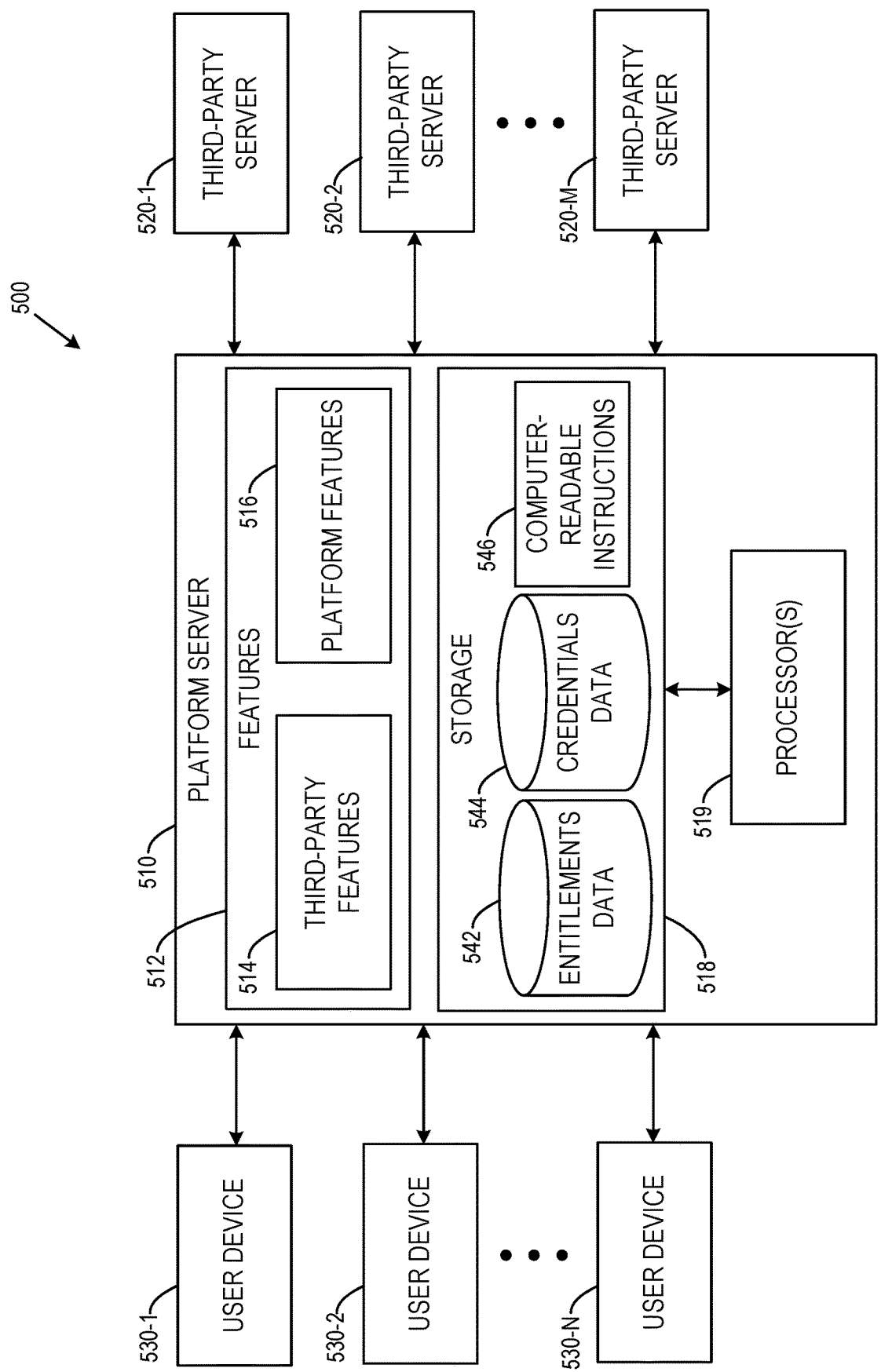
FIG. 5 is a simplified block diagram of an online automotive commerce exchange platform system.

FIG. 5 is a simplified block diagram of an online automotive commerce exchange platform system 500, according to some embodiments. The system 500 includes a platform server 510 in electronic communication (e.g., via one or more communication interfaces) with a plurality of third-party servers 520-1, 520-2, . . . , 520-M and a plurality of user devices 530-1, 530-2, . . . , 530-N. The platform server 510 may be configured to provide the exchange platform 300 discussed above with reference to FIGS. 2 and 3. The user devices 530-1, 530-2, . . . , 530-N may include devices 202 of partners, devices 204 of dealers, devices 206 of developers, devices 207 of service providers, devices 208 of system integrators, or other devices, as discussed above with reference to FIG. 2. The plurality of third-party servers 520-1, 520-2, . . . , 520-M are sometimes generically referred to herein individually as "third-party server 520" and together as "third-party servers 520," and the plurality of user devices 530-1, 530-2, . . . , 530-N are sometimes generically referred to herein individually as "user device 530" and together as "user devices 530."

The platform server 510 is configured to provide, to users of the user devices 530, access to features 512. The features 512 include platform features 516 provided by the platform server 510 and third-party features 514 provided by the third-party servers 520. The third-party servers 520 are each configured to service one or more of the third-party features 514. In some embodiments the third-party features 514 include a plurality of different DMS systems. In some embodiments the third-party features 514 include repair order features, e-payment features, quote engine features, DMS features, tax engine features, or combinations thereof.

In some embodiments, the platform features 516 include features of transaction management 220 (e.g., consistent APIs 222, API test 224, event management 226, analytics/insights 228 etc.), features of a developer network 230 (e.g., developer portal 232, API test 234, forum/community 236, monetization 238 etc.), and features of provisioning 240 (e.g., marketplace 242, configurable workflows 244, billing/subscription 246, etc.) as discussed with reference to FIG. 2.

Rather than rely on various different sign-on credentials for each of the third-party features 514 or for each of the third-party servers 520, each user of the user devices 530 may access each of the features 512, including the third-party features 514, using a single set of sign-on credentials if entitlements to access these features 512 have been granted.

To enable the use of a single set of sign-on credentials for each user, the platform server 510 may include one or more data storage devices 518 including entitlements data 542, credentials data 544, and computer-readable instructions 546. The entitlements data 542 indicates which of the features 512 each of the users is entitled to access. In other words, the entitlements data 542 indicates entitlements of the users of the user devices 530 to access individualized subsets of the features 512 (e.g., the platform features 516 and the third-party features 514). The credentials data 544 indicates a single set of sign-on credentials for each of the users of the user devices 530. In some embodiments the single set of sign-on credentials for each user may include a single user identification and a single password.

The computer-readable instructions 546 are configured to instruct one or more processors 519 of the platform server 510 to provide the features 512 (e.g., the platform features 516 and the third-party features 514) on the automotive commerce exchange platform, and provide access to individualized subsets of the features (as indicated by the entitlements data 542) to the users via the individualized sets of sign-on credentials (as indicated in the credentials data 544). Each individualized set of sign-on credentials corresponds to a different one of the users, such that each user can access whichever of the features 512 the user is entitled to access using a single set of sign-on credentials associated with the user.

In some embodiments, some of the users of the user devices 530 include users affiliated with a provider of the automotive commerce exchange platform. In some embodiments, some of the users of the user devices 530 include users affiliated with the third-party servers 520 (e.g., users affiliated with third-party feature providers). In some embodiments some of the users of the user devices 530 include consumers of the third-party features 514.

In some embodiments the features 512 include one or more hierarchies of features. For example, one of the features 512 may include a DMS feature, which may include several sub-features. An entity of a dealership using the DMS feature may be granted certain ones of the sub-features, and a customer of the dealership may be granted different sub-features of the DMS feature. It will be understood that a developer of the DMS feature may be granted entitlements to access yet a different subset of the sub-features of the DMS feature, as would a system integrator.

In some embodiments, the computer-readable instructions 546 are further configured to instruct the processors 519 to modify the entitlements data 542 to augment, decrease, or change entitlements granted to one or more of the users. By way of non-limiting example, the entitlements data 542 may indicate that a first user has access to a first feature of the third-party features 514. The first feature may enable the first user to change the entitlements data 542 to adjust one or more entitlements of a second user of the first feature (e.g., increasing, decreasing, or removing the entitlements of the second user). In some embodiments, the entitlements data 542 may indicate that the first user is entitled to add to, take away from, and remove the one or more entitlements of the second user. The platform server 510 may be configured to change the entitlements data 542 to modify the one or more entitlements of the second user responsive to the first user requesting, using one of the user devices 530 or one of the third-party servers 520, that the one or more entitlements be modified. As a specific non-limiting example, the first user may be an entity of a first third-party feature provider, and the second user may be an end user of one or more third-party features 514 provided by the third-party feature provider. The entitlements data 542 may indicate that the entity of the first third-party feature provider has entitlements to adjust the end user's entitlements to one or more third-party features 514 provided by the third-party feature provider.

In some embodiments, the computer-readable instructions 546 are further configured to instruct the processors 519 to execute a plurality of different third-party software interfaces for at least some of the plurality of different third-party features 514 and provide the users access to their individualized subsets of the third-party features 514, via the user devices 530, using a single standardized software interface executed by the user devices 530.

In some embodiments the computer-readable instructions 546 are further configured to instruct the processors 519 to provide, to the users via the user devices 530, access to one or more individualized subsets of the platform features 516 provided by the automotive commerce exchange platform, via the users' single individualized sets of sign-on credentials.

Figure 6:
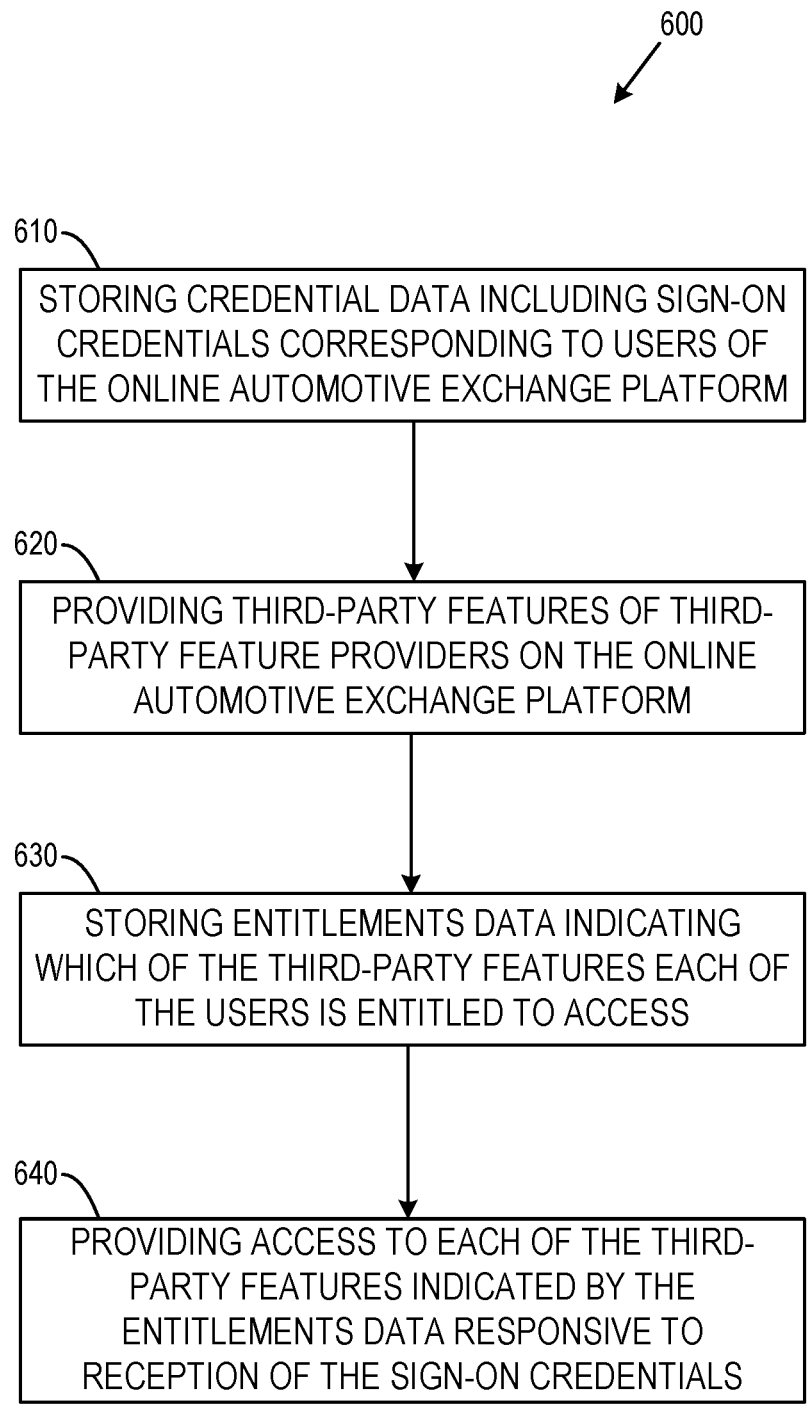
FIG. 6 is a simplified flow chart illustrating a method of operating an online automotive exchange platform.

FIG. 6 is a simplified flowchart illustrating a method 600 of operating an online automotive exchange platform. Referring to FIGS. 5 and 6 together, the method 600 includes storing 610, on one or more data storage devices 518, credentials data 544 including a plurality of sets of sign-on credentials corresponding to a plurality of users of the online automotive exchange platform (e.g., the exchange platform 300 of FIGS. 2 and 3). Each set of sign-on credentials of the plurality of sets of sign-on credentials corresponds to a different one of the plurality of users. The method 600 also includes providing 620 a plurality of third-party features 514 of a plurality of third-party feature providers on the online automotive exchange platform.

The method 600 further includes storing 630, on the one or more data storage devices 518, entitlements data 542 indicating which of the plurality of third-party features 514 each of the plurality of users is entitled to access using the corresponding set of sign-on credentials of the plurality of sets of sign-on credentials. The method 600 also includes providing 640, to each of the plurality of users, access to each of the plurality of third-party features 514 indicated by the entitlements data 542 responsive to reception of the corresponding set of sign-on credentials.

It will be apparent to those having skill in the art that many changes may be made to the details of the above-described embodiments without departing from the underlying principles of the invention. The scope of the present invention should, therefore, be determined only by the following claims.

The invention claimed is:

1. A computer server, comprising:
one or more processors of an automotive commerce exchange platform;
a communication interface configured to enable the one or more processors to communicate with a plurality of user devices of a plurality of users of the automotive commerce exchange platform; and
one or more computer-readable storage media operably coupled to the one or more processors, the one or more computer-readable storage media having computer-readable instructions stored thereon, the computer-readable instructions configured to instruct the one or more processors to:
provide a plurality of different platform features associated with the automotive commerce exchange platform, wherein the plurality of different platform features comprises transaction management platform features, developer network platform features, provisioning platform features, or a combination thereof,
provide a plurality of different third-party features of a plurality of different third-party feature providers on the automotive commerce exchange platform, wherein the plurality of different third-party features comprises a plurality of different dealership management software (DMS) systems each provided by a corresponding one of a plurality of DMS providers;
storing entitlements data indicating entitlements of the plurality of users to the individualized subsets of the plurality of different third-party features;
modifying the entitlements data to augment, decrease, or change entitlements grants to one or more of the plurality of users; and
based at least on receiving one or more of a plurality of single individualized sets of sign-on credentials, provide, to the plurality of users via the plurality of user devices, access to individualized subsets of the plurality of different third-party features and access to individualized subsets of the plurality of different platform features via the plurality of single individualized sets of sign-on credentials, wherein each single individualized set of sign-on credentials of the plurality of single individualized sets of sign-on credentials corresponds to a different one of the plurality of users.

2. The computer server of claim 1, wherein each single individualized set of sign-on credentials for each of the plurality of users comprises a single user identification and a single password.

3. The computer server of claim 1, wherein the computer-readable instructions are further configured to:
instruct the one or more processors to execute a plurality of different third-party software interfaces for the plurality of different third-party features, and
provide the plurality of users access to their individualized subsets of the plurality of different third-party features, via the plurality of user devices, using a single standardized software interface executed by the plurality of user devices.

4. The computer server of claim 1, wherein the computer-readable instructions are further configured to instruct the one or more processors to provide, to the plurality of users via the plurality of user devices, access to one or more individualized subsets of a plurality of platform features provided by the automotive commerce exchange platform, the access via the single individualized sets of sign-on credentials of the plurality of users.

5. The computer server of claim 1, wherein the plurality of users comprises one or more users affiliated with a provider of the automotive commerce exchange platform.

6. The computer server of claim 1, wherein the plurality of users comprises a plurality of users affiliated with the plurality of third-party feature providers.

7. The computer server of claim 1, wherein the plurality of users comprises a plurality of consumers of the third-party features.

8. A method of operating an online automotive exchange platform, the method comprising:
storing, on one or more data storage devices, credential data including a plurality of sets of sign-on credentials corresponding to a plurality of users of the online automotive exchange platform, each set of sign-on credentials of the plurality of sets of sign-on credentials corresponding to a different one of the plurality of users;
providing a plurality of different platform features associated with the online automotive exchange platform, wherein the plurality of different platform features comprises transaction management platform features, developer network platform features, provisioning platform features, or a combination thereof;
providing a plurality of third-party features each provided to the online automotive exchange platform by a third-party server of one of a plurality of third-party feature providers for the online automotive exchange platform;
storing, on the one or more data storage devices, entitlements data indicating which of the plurality of third-party features each of the plurality of users is entitled to access using the corresponding set of sign-on credentials of the plurality of sets of sign-on credentials, wherein the entitlements data indicates that a first user of the plurality of users has access to a first feature of the plurality of third-party features, the first feature enabling the first user to change the entitlements data to adjust one or more entitlements of a second user of the plurality of users, wherein the chaining comprises an increase in entitlements, a decrease in entitlements, a removal of all the entitlements of the second user or combination thereof;
providing, to each of the plurality of users, access to each of the plurality of third-party features indicated by the entitlements data responsive to reception of the corresponding set of sign-on credentials, and
providing, to each of the plurality of users, access to an individualized subset of the plurality of different platform features based at least on, and responsive to the reception of, the corresponding set of sign-on credentials.

9. The method of claim 8, wherein changing the entitlements data to adjust one or more entitlements of a second user comprises increasing the entitlements of the second user.

10. The method of claim 8, wherein changing the entitlements data to adjust one or more entitlements of a second user comprises decreasing the entitlements of the second user.

11. The method of claim 8, wherein changing the entitlements data to adjust one or more entitlements of a second user comprises removing all the entitlements of the second user.

12. The method of claim 8, wherein the first user is an entity of a first third-party feature provider of the plurality of third-party feature providers, and the second user is an end user of one or more third-party features provided by the first third-party feature provider, wherein the entitlements data indicates that the entity of the first third-party feature provider has entitlements to adjust the end user's entitlements to the one or more third-party features provided by the first third-party feature provider.

13. An online automotive commerce exchange platform system, comprising:
- a plurality of third-party servers, each third-party server of the plurality configured to service one or more third-party features of a plurality of third-party features of the online automotive commerce exchange platform system;
- a plurality of user devices of a plurality of users of the online automotive commerce exchange platform system; and
- a platform server in electronic communication with the plurality of third-party servers and the plurality of user devices, the platform server configured to:
- provide a plurality of different platform features associated with the online automotive commerce exchange platform system, wherein the plurality of different platform features comprises transaction management platform features, developer network platform features, provisioning platform features, or a combination thereof,
- store entitlements data indicating which of the plurality of third-party features and which of the plurality of different platform features each of the plurality of users is entitled to access;
- store credentials data indicating a single set of sign-on credentials for each of the plurality of users;
- provide a first user of the plurality of users access, via one of the plurality of user devices, to those of the plurality of third-party features and the plurality of different platform features indicated by the entitlements data responsive to reception of a user-provided set of sign-on credentials that matches the single set of sign-on credentials stored for the first user; and
- change the entitlements data to modify the one or more entitlements of the first user responsive to a second user of the plurality of users requesting, using a third-party feature provided to the online automotive commerce exchange platform system by one of the plurality of third-party servers, that the one or more entitlements be modified, wherein the entitlements data indicates that the second user is entitled to add to, take away from and remove the one or more entitlements of the first user.

14. The online automotive commerce exchange platform system of claim 13, wherein the entitlements data indicates that the second user is entitled to change one or more entitlements of the first user.

* * * * *